(12) United States Patent
Roberts

(10) Patent No.: US 11,755,488 B2
(45) Date of Patent: *Sep. 12, 2023

(54) DEMAND DELAY AND DATA VALUE CORRELATED MEMORY PRE-FETCHING SYSTEMS AND METHODS

(71) Applicant: Micron Technology, Inc., Boise, ID (US)

(72) Inventor: David Andrew Roberts, Wellesley, MA (US)

(73) Assignee: Micron Technology, Inc., Boise, ID (US)

(*) Notice: Subject to any disclaimer, the term of this patent is extended or adjusted under 35 U.S.C. 154(b) by 92 days.

This patent is subject to a terminal disclaimer.

(21) Appl. No.: 17/491,119

(22) Filed: Sep. 30, 2021

(65) Prior Publication Data
US 2022/0019538 A1 Jan. 20, 2022

Related U.S. Application Data

(63) Continuation of application No. 16/538,551, filed on Aug. 12, 2019, now Pat. No. 11,151,043.

(51) Int. Cl.
*G06F 12/0862* (2016.01)
*G06F 3/06* (2006.01)

(52) U.S. Cl.
CPC .......... *G06F 12/0862* (2013.01); *G06F 3/064* (2013.01); *G06F 3/0611* (2013.01);
(Continued)

(58) Field of Classification Search
CPC .... G06F 12/0862; G06F 3/0622; G06F 3/064; G06F 3/0688; G06F 3/0649;
(Continued)

(56) References Cited

U.S. PATENT DOCUMENTS 5,005,089 A 4/1991 Thanos et al.
5,754,764 A 5/1998 Davis et al.
(Continued)

FOREIGN PATENT DOCUMENTS

CN 101103344 A 1/2008

OTHER PUBLICATIONS

CN Office Action for CN Application No. 202010748268.9, dated Dec. 8, 2021.
(Continued)

*Primary Examiner* — Michael Krofcheck
(74) *Attorney, Agent, or Firm* — Fletcher Yoder, P.C.

(57) ABSTRACT

Systems, apparatuses, and methods for predictive memory access are described. Memory control circuitry instructs a memory array to read a data block from or write the data block to a location targeted by a memory access request, determines memory access information including a data value correlation parameter determined based on data bits used to indicate a raw data value in the data block and/or an inter-demand delay correlation parameter determined based on a demand time of the memory access request, predicts that read access to another location in the memory array will subsequently be demanded by another memory access request based on the data value correlation parameter and/or the inter-demand delay correlation parameter, and instructs the memory array to output another data block stored at the other location to a different memory level that provides faster data access speed before the other memory access request is received.

20 Claims, 9 Drawing Sheets

(52) U.S. Cl.
CPC .......... *G06F 3/0622* (2013.01); *G06F 3/0649* (2013.01); *G06F 3/0688* (2013.01); *G06F 2212/6024* (2013.01); *G06F 2212/6026* (2013.01)

(58) Field of Classification Search
CPC ............. G06F 3/0611; G06F 2212/602; G06F 2212/6022; G06F 2212/6024; G06F 2212/6026; G06F 2212/6028; G06F 9/544
See application file for complete search history.

(56) References Cited

U.S. PATENT DOCUMENTS

| | | |
|---|---|---|
| 5,765,213 A | 6/1998 | Ofer |
| 5,996,061 A | 11/1999 | Lopez-Aguado et al. |
| 6,721,870 B1 | 4/2004 | Yochai et al. |
| 7,392,340 B1 | 6/2008 | Dang et al. |
| 8,612,374 B1 | 12/2013 | Amdahl et al. |
| 2010/0135085 A1 | 6/2010 | Breitwisch et al. |
| 2015/0293850 A1 | 10/2015 | Shindo |
| 2017/0353576 A1 | 12/2017 | Bernat et al. |
| 2019/0361811 A1 | 11/2019 | Saeki et al. |
| 2020/0242037 A1 | 7/2020 | Navon et al. |
| 2020/0364055 A1 | 11/2020 | Al Sheikh et al. |

OTHER PUBLICATIONS

Leeor Peled et al., A neural network memory prefetcher using semantic locality, Israel Institute of Technology, Jul. 26, 2018, 13 pages.
Kyle J. Nesbit et al., AC/DC: An adaptive data cache prefetcher, University of Wisconsin—Madison, 11 pages.
Rober Cooksey et al., Content-Based Prefetching: Initial Results, University of Colorado, 2001, 23 pages.
Manjunath Shevgoor et al., Efficiently Prefetching Complex Address Patterns, University of Utah, 12 pages.

DEMAND DELAY AND DATA VALUE CORRELATED MEMORY PRE-FETCHING SYSTEMS AND METHODS

CROSS-REFERENCE TO RELATED APPLICATION

This application is a continuation of U.S. Non-Provisional application Ser. No. 16/538,551, entitled "DEMAND DELAY AND DATA VALUE CORRELATED MEMORY PRE-FETCHING SYSTEMS AND METHODS," filed Aug. 12, 2019, which is incorporated herein by reference in their entireties.

BACKGROUND

The present disclosure generally relates to computing systems and, more particularly, to memory interfaces implemented in computing systems.

Generally, a computing system includes a processing sub-system and a memory sub-system, which may store data accessible to processing circuitry of the processing sub-system. For example, to perform an operation, the processing circuitry may execute corresponding instructions retrieved from a memory device implemented in the memory sub-system. In some instances, data input to the operation may also be retrieved from the memory device. Additionally or alternatively, data output (e.g., resulting) from the operation may be stored in the memory device, for example, to enable subsequent retrieval. However, at least in some instances, operational efficiency of a computing system may be limited by its architecture, for example, which governs the sequence of operations performed in the computing system.

BRIEF DESCRIPTION OF THE DRAWINGS

Various aspects of the present disclosure may be better understood upon reading the following detailed description and upon reference to the drawings in which.

DETAILED DESCRIPTION

Figure 1:
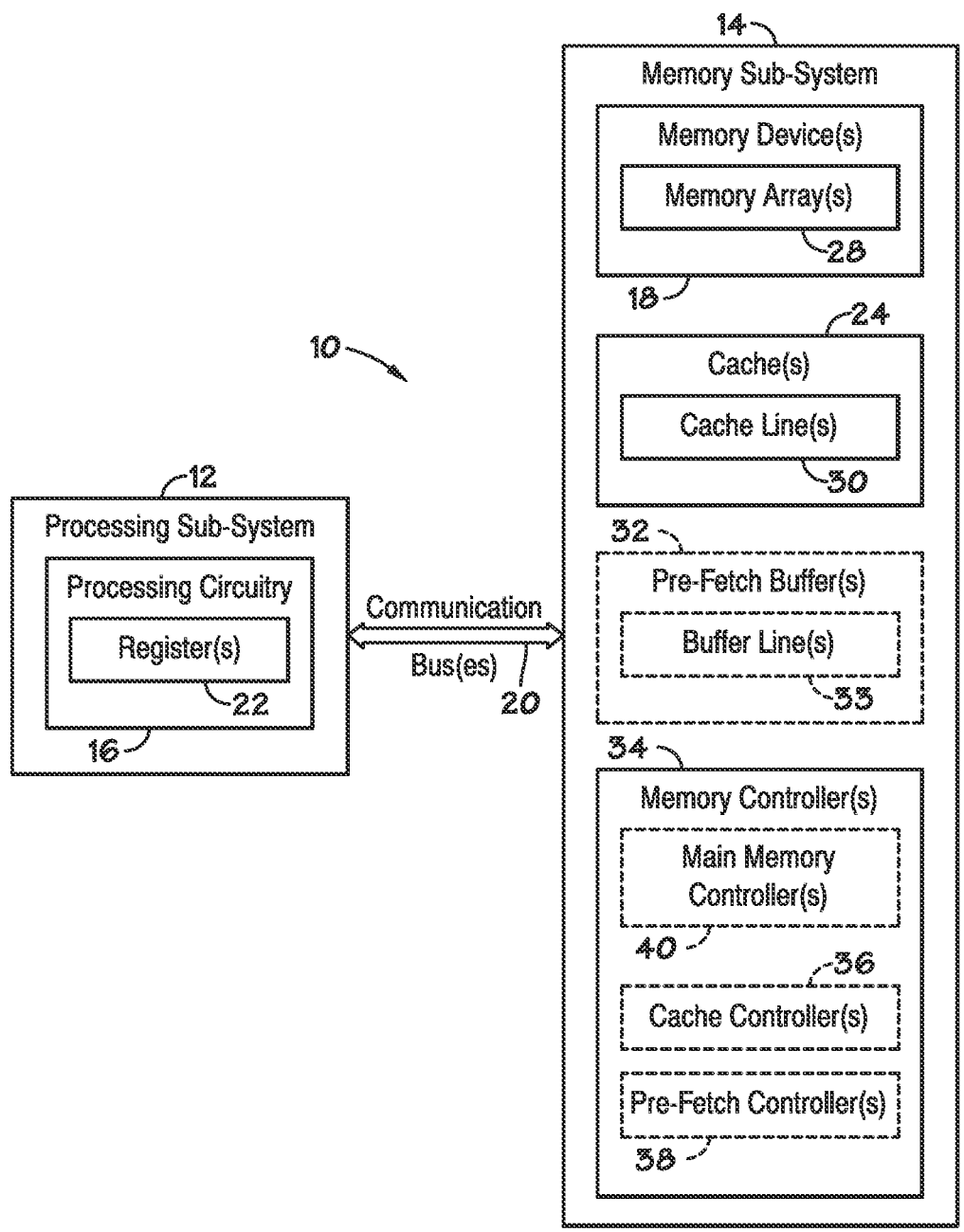
FIG. 1 is a block diagram of a computing system that includes a processing sub-system and a memory sub-system, in accordance with an embodiment of the present disclosure.

The present disclosure provides techniques that facilitate improving operational efficiency of computing systems, for example, by mitigating architectural features that may otherwise limit operational efficiency. Generally, a computing system may include various sub-systems, such as a processing sub-system and/or a memory sub-system. In particular, the processing sub-system may include processing circuitry, for example, implemented in one or more processors and/or one or more processor cores. The memory sub-system may include one or more memory devices (e.g., chips or integrated circuits), for example, implemented on a memory module, such as a dual in-line memory module (DIMM), and/or organized to implement one or more memory arrays (e.g., array of memory cells).

Generally, during operation of a computing system, processing circuitry implemented in its processing sub-system may perform various operations by executing corresponding instructions, for example, to determine output data by performing a data processing operation on input data. Additionally, a processing sub-system may generally include one or more registers, which provide storage locations directly accessible to its processing circuitry. However, storage capacity of registers implemented in a processing sub-system is generally limited.

As such, a processing sub-system is often communicatively coupled to a memory sub-system that provides additional storage (e.g., memory) locations, for example, via a memory array implemented in one or more memory devices. Generally, a memory array may include memory cells coupled to word lines formed in a first (e.g., horizontal) direction and to bit lines formed in a second (e.g., vertical or orthogonal) direction. In some instances, the memory cells in a memory array may be organized into one or more memory pages, for example, each corresponding with a memory cell row of the memory array. In other words, at least in such instances, a memory page in the memory array may include each of the memory cells coupled to a corresponding word line.

Additionally, in some instances, the memory cells in a memory page (e.g., memory cell row) may be organized into one or more data block storage locations, for example, each included in a corresponding memory cell column of the memory array. In other words, at least in such instances, a data block storage location in a memory page may include each of the memory cells coupled to one of multiple corresponding bit lines. Moreover, to facilitate reading (e.g., retrieving) data from a memory array and/or writing (e.g., storing) data to the memory array, the bit lines of each memory cell column of the memory array may be coupled to corresponding amplifier circuitry, for example, which includes a driver (e.g., writing) amplifier and/or a sense (e.g., reading) amplifier. In other words, at least in some instances, a storage location in a memory array and/or a data block associated with (e.g., stored at or to be stored at) the storage location may be identified based at least in part a memory address parameter, for example, which indicates a corresponding absolute memory address (e.g., row address and column address pairing).

In some instances, access to a storage location (e.g., memory address) in a memory sub-system may be demanded via a demand memory access requests, which indicates one or more request parameters to be used by the memory sub-system to provide the demanded memory (e.g., read and/or write) access. For example, to store (e.g., write) a data block to the memory sub-system, the processor-side of the computing system may output a write memory access request that indicates one or more write request parameters, such as a virtual memory address used by processing circuitry to identify a storage location in the memory sub-system at which the data block is to be stored, a physical memory address (e.g., row address and column address pairing) of the storage location at which the data block is to be stored, size (e.g., bit depth) of the data block, and/or a write enable indicator (e.g., bit). Additionally or alternatively, to retrieve (e.g., read) a data block from the memory sub-system, the processor-side of the computing system may output a read memory access request that indicates read request parameters, such as a virtual memory address used by processing circuitry to identify the data block or a storage location in the memory sub-system at which the data block is stored, a physical memory address (e.g., row address and column address pairing) of the storage location at which the data is stored, size (e.g., bit depth) of the data block, and/or a read enable indicator (e.g., bit).

To fulfill a read memory access request, a memory sub-system may search for a data block targeted by the read memory access request based at least in part on the read request parameters indicated in the read memory access request. For example, the memory sub-system may determine a target value of a tag (e.g., block identifier) parameter (e.g., metadata) expected to be associated with the target data block based at least in part on a virtual memory address and/or a physical memory address indicated in the read request parameters. Additionally, the memory sub-system may identify (e.g., find) the target data block by successively searching the value of tag parameters associated with valid data blocks stored therein against the target tag parameter value. Once a match is detected, the memory sub-system may identify an associated data block as the target data block and, thus, return the associated data block to the processing sub-system, for example, to enable processing and/or execution by its processing circuitry. Accordingly, at least in some instances, operational efficiency of a computing system may be dependent at least in part on data retrieval latency (e.g., duration before target data is returned) provided by its memory sub-system.

To facilitate improving data access speeds (e.g., retrieval latency), in some instances, total storage capacity of a memory sub-system may be distributed across multiple hierarchical memory levels (e.g., layers). Generally, a hierarchical memory sub-system may include a lowest memory level closest to the processing circuitry and a highest memory level farthest from the processing circuitry. Additionally, in some instances, the hierarchical memory sub-system may include one or more intermediate memory levels between the lowest memory level and the highest memory level. In other words, an intermediate memory level may be implemented farther from the processing circuitry compared to the lowest memory level and closer to the processing circuitry compared to the highest memory level.

Generally, in a hierarchical memory sub-system, a lower memory level may be implemented to provide faster data access speed compared to a higher memory level. For example, the lower memory level may be implemented using one or more caches and/or one or more buffers, such as a pre-fetch buffer. On the other hand, the higher memory level may be implemented using one or more memory arrays, for example, implemented in one or more memory devices of the memory sub-system.

As such, in an effort to reduce data retrieval latency, a hierarchical memory sub-system may generally attempt to retrieve demanded (e.g., targeted and/or requested) data from the lowest hierarchical before successively progressing to higher memory levels if the demanded data results in a miss (e.g., target tag value does not match any valid tag values). To help illustrate, continuing with the above example, the memory sub-system may, in response to receipt of a read memory access request, check whether a data block targeted by the read memory access request is currently stored in the lower (e.g., cache and/or pre-fetch buffer) memory level. When the target data block is currently stored in the lower memory level, the memory sub-system may determine that that the target data block results in a lower memory level hit and, thus, does not result in a lower memory level miss. Additionally, when the target data block results in a lower memory level hit, the memory sub-system may instruct the lower memory level to output the target data block for supply to processing circuitry of a processing sub-system.

On the other hand, when the target data block is not currently stored in the lower memory level, the memory sub-system may determine that that the target data block results in a lower memory level miss and, thus, does not result in a lower memory level hit. Additionally, when the target data block results in a lower memory level miss, the memory sub-system may check whether the target data block is currently stored in the memory array and, thus, whether the target data block results in a higher (e.g., memory array) memory level hit. When the target data block results in a higher memory level hit, the memory sub-system may instruct the memory array to output the target data block for supply to the processing circuitry of the processing sub-system, for example, via a memory (e.g., external communication) bus coupled between a processor-side of the computing system and a memory-side of the computing system.

However, at least in some instances, data communication via an external communication bus, such as a memory bus, is generally slower than data communication via an internal communication bus, for example, due to timing differences between components on a processor-side of the memory bus and components on a memory-side of the memory bus, the memory bus being shared with other computing sub-systems, and/or communication distance along the memory bus. In other words, at least in some instances, data communication between (e.g., internal to) the memory-side components may be faster than data communication between the memory-side components and the processor-side components via the memory bus.

Additionally or alternatively, data communication between (e.g., internal to) the processor-side components may be faster than data communication between the processor-side components and the memory-side components via the memory bus.

Accordingly, to facilitate improving computing system operational efficiency, in some instances, a portion of a memory sub-system may be implemented on a processor-side of a memory bus. In other words, at least in some instances, a memory sub-system may include a processor-side (e.g., first) portion and a memory-side (e.g., second) portion communicatively coupled via a memory (e.g., external communication) bus. For example, the memory-side of the memory sub-system may include one or more memory-side caches, one or more memory-side pre-fetch buffers, one or more memory arrays, or any combination thereof, which are used to implement one or more memory-side memory levels hierarchically higher than each memory level implemented in the processor-side of the memory sub-system. Additionally or alternatively, the processor-side of the memory sub-system may include one or more processor-side caches and/or one or more processor-side pre-fetch buffers, which are used to implement one or more processor-side memory levels hierarchically lower than each memory level implemented in the memory-side of the memory sub-system.

As described above, in a hierarchical memory sub-system, a lower (e.g., cache and/or pre-fetch buffer) memory level may generally be implemented to provide faster data access speed compared to a higher (e.g., memory array) memory level. In other words, compared to retrieval from the higher memory level, retrieving (e.g., returning) data targeted by a read memory access request from the lower memory level may generally result in faster data retrieval and, thus, shorter data retrieval latency, which, at least in some instances, may facilitate improving operational efficiency of a processing sub-system requesting (e.g., demanding) return of the demanded data and, thus, a computing system in which the processing sub-system is deployed. In fact, to facilitate further improving computing system operational efficiency, in some instances, the memory sub-system may predictively control data storage in its hierarchical memory levels, for example, by preemptively (e.g., predictively) pre-fetching data, which is expected to be subsequently demanded, from a higher (e.g., memory array) memory level to a lower (e.g., cache and/or pre-fetch buffer) memory level before the processing sub-system actually demands (e.g., requests) return of the data.

However, to facilitate providing faster data access speed, a lower (e.g., cache and/or pre-fetch buffer) memory level is generally implemented with less storage capacity compared to a higher (e.g., memory array) memory level, for example, since increasing storage capacity may enable an increase in the number of valid data blocks stored therein and, thus, potentially increase the amount of searching performed before a target data block is identified and returned. As such, to make room for storage of a pre-fetched data block, at least in some instances, a lower memory level may evict another data block, for example, which is selected based at least in part on what data a processing sub-system is expected (e.g., predicted) to be demand during an upcoming (e.g., subsequent) control horizon (e.g., one or more clock cycles or time period). In other words, in some instances, the other data block may be selected for eviction based at least in part on a prediction that the pre-fetched data block will be demanded during an upcoming control horizon, but the other data block will not be demanded during the upcoming control horizon. However, at least in some instances, improperly pre-fetching data from a higher (e.g., memory array) memory level to a lower (e.g., cache and/or pre-fetch buffer) memory level may actually reduce computing system operational efficiency, for example, due to data evicted from the lower memory level to make room for pre-fetched data actually being demanded during the control horizon and, thus, being retrieved from the higher memory level instead of the lower memory level.

Accordingly, to facilitate improving computing system operational efficiency, the present disclosure provides techniques for implementing and/or operating a memory sub-system to improve efficacy (e.g., coverage and/or accuracy) of data pre-fetching, for example, by predictively controlling data storage in hierarchical memory levels of the memory sub-system using memory access patterns determined (e.g., predicted) based at least in part on data value correlations and/or demand delay correlations. To facilitate controlling data storage, the memory sub-system may include one or more memory controllers (e.g., control circuitry and/or control logic). For example, when implemented on a processor-side of a memory bus and a memory-side of the memory bus, the memory sub-system may include a first (e.g., processor-side) memory controller implemented and/or operated to control data storage in the processor-side of the memory sub-system and a second (e.g., memory-side) memory controller implemented and/or operated to control data storage in the memory-side of the memory sub-system.

Additionally or alternatively, a memory controller may include multiple controllers (e.g., control circuitry and/or control logic), such as a cache controller, a pre-fetch controller, and/or a main memory controller. In some embodiments, a main memory controller, such as a dynamic random-access memory (DRAM) memory controller, may be implemented and/or operated to control data storage in one or more memory array and, thus, corresponding memory array (e.g., higher) memory levels. Additionally, in some embodiments, a cache controller may be implemented and/or operated to control data storage in one or more caches and, thus, corresponding cache (e.g., lower) memory levels. For example, the cache controller may instruct a cache to store a copy (e.g., instance) of data that is retrieved from a memory array in response to a read memory access request and/or data that is stored to the memory array in response to a write memory access request.

Furthermore, in some embodiments, a pre-fetch controller may be implemented and/or operated to control data storage in one or more pre-fetch buffers and, thus, corresponding pre-fetch (e.g., lower) memory levels. Additionally or alternatively, a pre-fetch controller may facilitate predictively pre-fetching data from a higher (e.g., memory array) memory level to a lower (e.g., cache and/or pre-fetch buffer) memory level, for example, by determining (e.g., predicting) a subsequent memory access pattern and identifying one or more data blocks targeted by the subsequent memory access pattern as candidate pre-fetch data. In some embodiments, pre-fetched data may be stored in a pre-fetch buffer, for example, before transfer to a cache. In other embodiments, pre-fetched data may be directly stored into a cache and, thus, the pre-fetch buffer may be obviated (e.g., optional) and not included.

In any case, as described above, in an effort to improve computing system operational efficiency, a memory sub-system may predictively control data storage in one or more of its hierarchical memory levels, for example, by predicting a subsequent memory access pattern that will occur during an upcoming control horizon and adjusting data storage in the hierarchical memory levels accordingly. Since memory access patterns are often somewhat cyclical (e.g., repetitive), in some embodiments, a (e.g., processor-side and/or memory-side) memory controller may predict a subsequent memory access pattern based at least in part on memory access information associated with a memory access request currently being fulfilled and/or memory access information associated with one or more previously fulfilled memory access requests. In other words, to facilitate predicting a subsequent memory access pattern, the memory controller may historically track memory access information associated with memory access requests, for example, explicitly via a historical memory access information table and/or indirectly via input to a machine learning (e.g., neural network) block.

In some embodiments, memory access information resulting from (e.g., associated with) a memory access request may include one or more memory access information parameters associated with a storage location in a memory sub-system targeted by the memory access request and/or a data block associated with (e.g., read from and/or written to) the target storage location. For example, the memory access information parameters associated with a memory access request may include a memory address parameter, which identifies a storage location in the memory sub-system targeted by the memory access request, and one or more associated correlation parameters, which may be used to determine (e.g., identify) one or more (e.g., previous, current, and/or subsequent) memory access patterns. Thus, to facilitate predictively controlling data storage in a memory sub-system, in some embodiments, a memory controller may determine the value of one or more memory access information parameters to be included in memory access information associated with a memory access request, for example, in response to receipt and/or fulfillment of the memory access request.

In fact, in some embodiments, a (e.g., processor-side and/or memory-side) memory controller may determine the value of one or more memory access information parameters to be associated with a memory access request based at least in part on the value of one or more request parameters indicated in the memory access request. For example, the memory controller may determine a memory address parameter, which identifies a storage location targeted by a memory access request, based at least in part on a virtual memory address and/or a physical memory address indicated in the request parameters of the memory access request. As described above, in addition to a memory address parameter, memory access information associated with a memory access request may include one or more correlation parameters, which may be used to determine (e.g., predict) one or more memory access patterns.

In some embodiments, a correlation parameter included in memory access information associated with (e.g., resulting from) a memory access request may include an inter-demand address stride correlation parameter, which indicates the stride length (e.g., distance) between a storage location targeted by the memory access request and a storage location targeted by a previously fulfilled memory access request. For example, a memory controller may set the value of the inter-demand address stride correlation parameter based on the difference between the memory address of the storage location targeted by the memory access request and the memory address of a storage location targeted by a directly previous memory access request. As such, in some embodiments, a memory controller may determine the value of an inter-demand address stride correlation parameter to be associated with a memory access request based at least in part on the value of a memory address parameter associated with the memory access request and the value of a memory address parameter associated with a previously fulfilled memory access request.

Additionally, in some embodiments, a correlation parameter included in memory access information associated with (e.g., resulting from) a memory access request may be indicative of a transaction context of the memory access request. In particular, in some embodiments, transaction context of a memory access request may be indicated via one or more transaction context parameters, which each identify one or more aspects of the state of a computing system associated with (e.g., that generated and/or demanded) a data block and/or a storage location (e.g., memory address) targeted by the memory access request. For example, a set of transaction context parameters indicative of the transaction context may include a processor context parameter, which identifies a processor in the computing system that generated the data block, a processor in the computing system that is currently demanding access to the data block or the storage location, and/or a processor in the computing system that previously demanded access to the data block or the storage location.

In fact, in some embodiments, a set of transaction context parameters indicative of a transaction context of a memory access request may include transaction parameters that identify associated aspects of a computing system with varying (e.g., differing) levels of granularity (e.g., specificity). To help illustrate, continuing with the above example, the set of transaction context parameters indicative of the transaction context of the memory access request may additionally include a processor core context parameter, which identifies a processor core that generated the data block, a processor that is currently demanding access to the data block or the storage location, and/or a processor core that previously demanded access to the data block or the storage location. In some embodiments, the set of transaction context parameters indicative of the transaction context may additionally or alternatively include an application (e.g., program or thread) context parameter, which identifies an application that resulted in generation of the data block, an application that resulted in access to the data block or the storage location currently being demanded, and/or an application that resulted in access to the data block or the storage location previously being demanded. Additionally or alternatively, the set of transaction context parameters indicative of the transaction context may include an application instruction (e.g., program counter) context parameter, which identifies an application instruction that resulted in reading or writing the data block, an application instruction that resulted in access to the data block or storage location currently being demanded, and/or an application instruction that resulted in access to the data block or storage location previously being demanded.

In some embodiments, a set of transaction context parameters indicative of the transaction context of a memory access request may be indicated via a combined transaction context parameter, for example, determined by performing a hash operation (e.g., function) on the transaction context parameters included in the set. Additionally, in some embodiments, a memory access request may explicitly indicate the value of one or more transaction context parameters indicative of its transaction context, for example, in addition to one or more request parameters to be used by the memory sub-system to provide memory (e.g., read and/or write) access demanded by the memory access request. In other words, in such embodiments, a memory controller may determine the value of one or more correlation parameters to be associated with a memory access request based on the value of one or more corresponding transaction context parameters indicated in the memory access request.

However, in some embodiments, the value of one or more correlation parameters to be associated with a memory access request may not be explicitly indicated in the memory access request. For example, a correlation parameter associated with a memory access request may include a data value correlation parameter, which is determined based at least in part on data bits used to indicate a raw data value in a data block accessed (e.g., read and/or written) in response to the memory access request. Additionally or alternatively, a correlation parameter associated with a memory access request may include a demand delay correlation parameter, which is determined based at least in part on duration between a demand (e.g., receipt and/or transmission) time of the memory access request and the demand time of a (e.g., directly) previous memory access request.

In some embodiments, a (e.g., processor-side and/or memory-side) memory controller may associate a storage location targeted by a memory access request with one or more correlation parameters by including the one or more correlation parameters and a memory address parameter, which identifies the target storage location, in a set of input parameters supplied (e.g., input) to a machine learning (e.g., neural network) block for use during a cycle of the machine learning block. Additionally or alternatively, the memory controller may associate a storage location targeted by a memory access request with one or more correlation parameters by indicating the one or more correlation parameters and a memory address parameter, which identifies the target storage location, in a table entry of a historical memory access information table. For example, in response to receipt of a memory access request, the memory controller may determine a memory address parameter, which identifies a storage location targeted by the memory access request. Additionally, the memory controller may determine a data value correlation parameter based at least in part on data bits used to indicate a raw data value in a data block targeted by the memory access request and/or determine an inter-demand delay correlation parameter based at least in part on the demand time of the memory access request. The memory controller may then indicate (e.g., store) the memory address parameter as well as the data value correlation parameter and/or the inter-demand delay correlation parameter as a table entry in the historical memory access information table, thereby associating the storage location identified by the memory address parameter with the data value correlation parameter and/or the inter-demand delay correlation parameter.

In some embodiments, the duration between the demand time of a (e.g., directly) previous memory access request and the demand time of a (e.g., directly) subsequent memory access request may be directly used as an inter-demand delay correlation parameter associated with the subsequent memory access request. In other words, in such embodiments, a memory controller may set the value of the inter-demand delay correlation parameter associated with the subsequent memory access request as the time difference between the demand time of the previous memory access request and the demand time of the subsequent memory access request. However, at least in some instances, the duration between demand times of successive memory access requests may include noise (e.g., jitter and/or interruption), such as time spent servicing one or more processor interrupts, time spent performing one or more memory refreshes, and/or time spent performing one or more other background operations.

Thus, to facilitate improving data pre-fetching efficacy (e.g., accuracy and/or coverage), in some embodiments, the duration between the demand time of a previous memory access request and the demand time of a subsequent memory access request may be processed to remove (e.g., filter out) noise before being used as an inter-demand delay correlation parameter associated with the memory access request. In other words, in such embodiments, the duration between the demand times may be pre-processed to determine a noise-filtered inter-demand delay, which may then be used as an inter-demand delay correlation parameter associated with the subsequent memory access request. In some embodiments, a (e.g., processor-side and/or memory-side) memory controller may determine the noise-filtered inter-demand delay by processing the duration between successive demand times to ignore time spent performing background operations, such as processor interrupts and/or memory refreshes, for example, by delaying the previous demand time and/or advancing the subsequent (e.g., current) demand time to offset the time spent performing the background operations. Additionally or alternatively, the memory controller may quantize the duration between successive demand times to a coarser granularity (e.g., nearest four clock cycles), for example, such that memory access requests are re-ordered to facilitate determination of noise-filtered inter-demand delays.

Furthermore, in some embodiments, the data bits used to indicate a raw data value of a data block targeted by a memory access request may be directly used as a data value correlation parameter associated with the memory access request. In other words, in such embodiments, a (e.g., processor-side and/or memory-side) memory controller may set the value of the data value correlation parameter associated with the memory access request as the raw data value indicated by the data bits. However, at least in some instances, efficacy of predictive data pre-fetch techniques may vary with bit depth of correlation parameters, for example, due to larger (e.g., longer) bit depths increasing likelihood of overfitting a neural network and/or increasing the number of unique values to be historically tracked. Merely as an illustrative non-limiting example, predictive data pre-fetch techniques may historically track $2^{32}$ unique values when thirty-two bit correlation parameters are used, whereas the data pre-fetch techniques may historically track $2^{4}$ unique values when four bit correlation parameters are used.

Moreover, at least in some instances, different interpretations of the same data bits may result in different data values being determined. For example, interpreting the data bits as an integer value may result in a different data value compared to interpreting the data bits as a floating point value. In fact, since data blocks are processed in processing circuitry of a processing sub-system, at least in some instances, a memory sub-system and, thus, its memory controller may be unaware of an intended (e.g., proper) interpretation of the data bits included in a data block.

As such, to facilitate improving data pre-fetching efficacy (e.g., accuracy and/or coverage), in some embodiments, one or more data bits used to indicate a raw data value in a data block targeted by a memory access request may be processed to extract a representative data value, which, at least in some instances, may utilize a smaller (e.g., shorter) bit depth compared to the raw data value and, thus, facilitate correlation of memory access patterns. In other words, in such embodiments, the one or more data bits may be pre-processed to determine a value representative of the raw data value indicated in the target data block, which may then be used as a data value correlation parameter associated with the memory access request. In some embodiments, a (e.g., processor-side and/or memory-side) memory controller may determine a representative data value associated with a data block by determining the number of logic high data bits (e.g., "1-bits") used to indicate a raw data value in the data block. In other words, in such embodiments, the memory controller may determine the representative data value and, thus, a corresponding data value correlation parameter as a 1's count of the data bits in the data block.

Additionally, in some embodiments, a (e.g., processor-side and/or memory-side) memory controller may determine a representative data value associated with a data block by interpreting the data bits included in the data block using one or more default interpretations, for example, due to the intended (e.g., proper) interpretation of the data bits not being communicated from processing circuitry of a processing sub-system to the memory controller of a memory sub-system. As an illustrative example, to facilitate determining a representative data value associated with a data block, the memory controller may interpret data bits included in the data block as an integer value irrespective of whether the data bits are intended to be interpreted as an integer value or as a floating point value. Additionally or alternatively, the memory controller may interpret the data bits included in the data block as a floating point value irrespective of whether the data bits are intended to be interpreted as an integer value or as a floating point value. In some embodiments, the memory controller may then set the representative data value and, thus, a corresponding data value correlation parameter based on a resulting integer value and/or a resulting floating point value, for example, after rounding to a coarser precision.

In fact, in some embodiments, multiple representative data values may be extracted from a data block and, thus, multiple data value correlation parameters may be associated with a memory access request targeting the data block and/or a storage location at which the data block is stored. For example, a memory controller may determine a first representative data value of a data block by interpreting the data bits of the data block as an integer value and rounding the resulting integer value to a coarser precision. The memory controller may also determine a second (e.g., different) representative data value of the data block by interpreting the data bits of the data block as a floating point value and rounding the resulting floating point value to a coarser precision.

Furthermore, in some embodiments, interpreting data bits included in a data block using a default interpretation may include grouping (e.g., artificially dividing) the data bits into one or more naturally aligned sub-blocks, for example, before interpretation of each sub-block as an integer value and/or as a floating point value. As an illustrative example, a (e.g., processor-side and/or memory-side) memory controller may group the data bits of a data block into one or more eight-bit sub-blocks, one or more sixteen-bit sub-blocks, one or more thirty-two-bit sub-blocks, or any combination thereof. Additionally or alternatively, the memory controller may group the data bits of the data block into one or more sixty-four-bit sub-blocks, one or more one hundred twenty-eight bit sub-blocks, one or more two hundred fifty-six-bit sub-blocks, or any combination thereof.

In some embodiments, the data bits may be grouped such that sub-blocks of the same size (e.g., type) are non-overlapping. For example, the data bits may be grouped such that a first eight-bit sub-block includes the data bits indicated at bit position zero through bit position seven, a second eight-bit sub-block includes the data bits indicated at bit position eight through bit position fifteen, and so on. Additionally or alternatively, the data bits may be grouped such that different sub-blocks partially overlap. To help illustrate, continuing with the above-example, the data bits may be grouped such that a sixteen-bit sub-block includes the data bits indicated at bit position zero through bit position fifteen and, thus, partially overlaps with the first eight-bit sub-block as well as partially overlapping with the second eight-bit sub-block. In fact, in some embodiments, the data bits may be grouped such that one or more sub-blocks of the same size partially overlap. For example, the data bits may be grouped such that a first eight-bit sub-block includes the data bits indicated at bit position zero through bit position seven while a second eight-bit sub-block includes the data bits indicated at bit position one through bit position eight.

Moreover, in some embodiments, a (e.g., processor-side and/or memory-side) memory controller may determine a representative data value associated with a data block by interpreting (e.g., reading) data bits indicated at a specific subset of bit positions in the data block. In other words, in such embodiments, the specific subset of bit positions may include one or more representative data value bit positions from which corresponding data bits in a data block are to be read to determine a representative data value associated with the data block. In some embodiments, the representative data value bit positions included in the specific subset of bit positions may be predetermined. For example, in such embodiments, a memory controller may set a representative data value and, thus, a corresponding data value correlation parameter as the data bits indicated in N upper bit positions (e.g., N most-significant-bits) of the data block.

In other embodiments, representative data value bit positions to be included in the specific subset of bit positions may be adaptively (e.g., dynamically and/or selectively) determined. In particular, to facilitate improving usefulness of data value correlation parameters determined by reading the specific subset of bit positions, in some embodiments, a (e.g., processor-side and/or memory-side) memory controller may select a bit position that is expected to change over a reasonably short sequence (e.g., stream) of memory access requests as a representative data value bit position to be included in the specific subset of bit positions. For example, the memory controller may determine the data bits used to indicate raw data values in data blocks targeted by (e.g., associated with) multiple previous memory access requests. Additionally, for each bit position, the memory controller may exclusive-or (XOR) the bit values of corresponding data bits included in the previously targeted data blocks. In this manner, the memory controller may determine (e.g., identify) one or more bit positions at which bit values change over the course of the multiple previous memory access requests and select the one or more bit positions as representative data value bit positions, which are read to determine a data value correlation parameter to be included in memory access information.

Based on the correlation parameters and memory address parameters included in memory access information, a (e.g., processor-side and/or memory-side) memory controller may determine one or more memory access patterns. For example, the memory controller may determine a current memory access pattern ending at a storage location targeted by a memory access request currently being fulfilled based at least in part on memory access information associated with the current memory access request and/or memory access information associated with one or more memory access requests directly preceding the current memory access request. Additionally, the memory controller may determine a previous memory access pattern ending at a storage location targeted by a memory access request fulfilled prior (e.g., previous) to a current memory access request based at least on memory access information associated with the previous memory access request and/or memory access information associated one or more memory access requests preceding (e.g., directly) the previous memory access request.

To facilitate predicting a subsequent memory access pattern that will occur after a current memory access pattern, in some embodiments, a (e.g., memory-side and/or processor-side) memory controller may compare the current memory access pattern against one or more previous memory access patterns. In particular, when the current memory access pattern matches a previous memory access pattern, the memory controller may predict that a memory access pattern directly following the previous (e.g., matched) memory access pattern will also follow directly after the current memory access pattern. For example, when a previous memory access pattern matching the current memory access pattern is identified, the memory controller may determine a stride length (e.g., address distance) between a storage location targeted at the end of the previous (e.g., matched) memory access request and a storage location targeted by a memory access request directly following the previous memory access pattern (e.g., based at least in part on corresponding memory address parameters and/or inter-demand address stride correlation parameter associated with the directly following memory access request). Additionally, the memory controller may predict that a storage location that will be targeted directly following the current memory access request will be the stride length away from (e.g., after) a currently targeted storage location.

In fact, to facilitate further improving efficacy (e.g., coverage and/or accuracy) of predictive data pre-fetching techniques, in some embodiments, a (e.g., memory-side and/or processor-side) memory controller may determine multiple different types of memory access patterns. In particular, in some embodiments, the memory controller may determine current memory access patterns with varying (e.g., differing) sequence lengths. For example, the memory controller may determine a first current memory access pattern with a sequence length of one based on memory access information associated with a current memory access request. Additionally, the memory controller may determine a second current memory access pattern with a sequence length of two based on memory access information associated with the current memory access request and memory access information associated with a first previous memory access request directly preceding the current memory access request. Furthermore, the memory controller may determine a third current memory access pattern with a sequence length of three based on memory access information associated with the current memory access request, memory access information associated with the first previous memory access request directly preceding the current memory access request, and memory access information associated with a second previous memory access request directly preceding the first previous memory access request.

Compared to memory access patterns with shorter sequence lengths, matching memory access patterns with longer sequence lengths generally facilitates improving accuracy of a predicted subsequent memory access pattern. However, likelihood of matching memory access patterns with longer sequence lengths is generally lower than the likelihood of matching memory access patterns with shorter sequence lengths. As such, to facilitate improving coverage in addition to accuracy, in some embodiments, a memory controller may generally attempt to match a longest sequence length memory access pattern before successively progressing to shorter sequence length memory access patterns if a match is not identified.

To help illustrate, continuing with the above example, the memory controller may check whether the third current memory access pattern, which has with a sequence length of three, matches a three sequence length previous memory access pattern indicated in memory access information. When a three sequence length previous memory access pattern matching the third current memory access pattern is identified, as described above, the memory controller may predict a subsequent memory access pattern that will occur during an upcoming control horizon based at least in part on a memory access pattern directly following the three sequence length previous memory access request. On the other hand, when a match with the third current memory access pattern is not identified, the memory controller may check whether the second current memory access pattern, which has with a sequence length of two, matches a two sequence length previous memory access pattern indicated in the memory access information.

When a two sequence length previous memory access pattern matching the second current memory access pattern is identified, as described above, the memory controller may predict the subsequent memory access pattern that will occur during the upcoming control horizon based at least in part on a memory access pattern directly following the two sequence length previous memory access request. On the other hand, when a match with the second current memory access pattern is not identified, the memory controller may check whether the first current memory access pattern, which has with a sequence length of one, matches a one sequence length previous memory access pattern indicated in the memory access information.

When a one sequence length previous memory access pattern matching the first current memory access pattern is identified, as described above, the memory controller may predict the subsequent memory access pattern that will occur during the upcoming control horizon based at least in part on a memory access pattern directly following the one sequence length previous memory access request. On the other hand, when a match with the first current memory access pattern is not identified, the memory controller may cancel (e.g., disable) predictive data pre-fetching. In other words, in some embodiments, a memory controller may cancel predictive data pre-fetching when a matching previous memory access pattern is not identified for any of the one or more current memory access patterns, for example, to facilitate reducing likelihood of pre-fetched data merely polluting a lower (e.g., cache and/or pre-fetch buffer) memory level.

Furthermore, in some embodiments, a (e.g., processor-side and/or memory-side) memory controller may determine multiple sets of memory access patterns each corresponding with one or more different types of correlation parameters included in memory access information. For example, the memory controller may determine a current data value memory access pattern and one or more previous data value memory access patterns based at least in part on the data value correlation parameters indicated in associated memory access information. Additionally or alternatively, the memory controller may determine a current inter-demand delay memory access pattern and one or more previous inter-demand delay memory access patterns based at least in part on the inter-demand delay correlation parameters indicated in associated memory access information.

In fact, to facilitate further improving efficacy (e.g., coverage and/or accuracy) of predictive data pre-fetching techniques, in some embodiments, multiple different types of correlation parameters associated with a memory access request may be combined into a combined (e.g., signature) correlation parameter associated with the memory access request. Merely as an illustrative non-limiting example, a memory controller may determine a combined correlation parameter associated with a memory access request at least in part by indicating a data value correlation parameter associated with the memory access request, an inter-demand delay correlation parameter associated with the memory access request, an inter-demand address stride correlation parameter associated with the memory access request, a transaction (e.g., application and/or program counter) context parameter associated with the memory access request, or any combination thereof in an array of values. Thus, in such embodiments, a memory controller may additionally or alternatively determine a current combined (e.g., signature) memory access pattern and one or more previous combined memory access patterns based at least in part on the data value correlation parameters, the inter-demand delay correlation parameters, the inter-demand address stride correlation parameters, and/or the transaction context parameters indicated in associated memory access information.

As described above, in some embodiments, correlation parameters indicated in memory access information may include one or more transaction context parameters, such as a processor context parameter, a processor core context parameter, an application context parameter, an application instruction context parameters, and/or the like. To facilitate tracking transaction context of memory access requests, in some embodiments, a (e.g., processor-side and/or memory-side) memory controller may include one or more transaction context parameters as correlation parameters in a set of input parameters supplied (e.g., input) to a machine learning (e.g., neural network) block, for example, in addition to a corresponding memory address parameter as well as a corresponding data value correlation parameter and/or a corresponding inter-demand delay correlation parameter. Additionally or alternatively, a historical memory access information table may be organized (e.g., divided) into multiple table sections, which each corresponds with a different transaction context. For example, the historical memory access information table may include a first table section dedicated to indicating memory access information associated with a first transaction context, a second table section dedicated to indicating memory access information associated with a second (e.g., different) transaction context, and so on.

In other words, when memory access information is indicated via a historical memory access information table organized by transaction context, a (e.g., processor-side and/or memory-side) memory controller may indicate a table entry associated with a memory access request in a table section corresponding with the transaction context of the memory access request. Moreover, based on the table entries indicated in a table section, the memory controller may determine one or more memory access patterns that each correspond with an associated transaction context (e.g., set of one or more transaction context parameters). In other words, continuing with the above example, the memory controller may determine a first transaction context memory access pattern corresponding with the first transaction context based at least in part on memory access information indicated in one or more table entries of the first table section. Additionally or alternatively, the memory controller may determine a second transaction context memory access pattern corresponding with the second (e.g., different) transaction context based at least in part on memory access information indicated in one or more table entries of the second table section.

However, in some embodiments, transaction context of memory access requests may not be explicitly communicated to a memory sub-system. In some embodiments, a historical memory access information table may nevertheless be organized into multiple table sections, for example, such that each table section corresponds with a different group (e.g., range) of storage locations (e.g., memory addresses) and/or a different type of memory access. As an illustrative example, the historical memory access information table may include a read access table section dedicated to indicating memory access information (e.g., table entries) associated with read memory access requests and a write access table section dedicated to indicating memory access information associated with write memory access requests. Additionally or alternatively, the historical memory access information table may include a first table section dedicated to indicating memory access information associated with memory access requests targeting storage locations included in a first group of storage locations, a second table section dedicated to indicating memory access information associated with memory access requests targeting storage locations included in a second (e.g., different) group of storage locations, and so on.

In other words, when memory access information is indicated via a historical memory access information table organized by storage location groups (e.g., memory address ranges), a (e.g., processor-side and/or memory-side) memory controller may indicate a table entry associated with a memory access request in a table section corresponding with a storage location group that includes the storage location targeted by the memory access request. Moreover, based on the table entries indicated in a table section, the memory controller may determine one or more memory access patterns corresponding with an associated storage location group. In other words, continuing with the above example, the memory controller may determine a first memory address range memory access pattern corresponding with the first group (e.g., range) of storage locations based at least in part on memory access information indicated in one or more table entries of the first table section. Additionally or alternatively, the memory controller may determine a second memory address range memory access pattern corresponding with the second group (e.g., range) of storage locations based at least in part on memory access information indicated in one or more table entries of the second table section.

Similarly, when memory access information is indicated via a historical memory access information table organized by access type, a (e.g., processor-side and/or memory-side) memory controller may indicate a table entry associated with a memory access request in a table section corresponding with a type of memory access being demanded by the memory access request, for example, indicated via a read enable indicator and/or a write enable indicator included in request parameters of the memory access request. Moreover, based on the table entries indicated in a table section, the memory controller may determine one or more memory access patterns corresponding with an associated access type. In other words, continuing with the above example, the memory controller may determine a read memory access pattern corresponding with read memory accesses based at least in part on memory access information indicated in one or more table entries of the read access table section. Additionally or alternatively, the memory controller may determine a write memory access pattern corresponding with write memory accesses based at least in part on memory access information indicated in one or more table entries of the write access table section.

When multiple different types of memory access patterns are used (e.g., determined and/or searched), at least in some instances, multiple matches may be identified. In some instances, different types of current memory access patterns may be matched to previous memory access patterns corresponding with the same sequence of previous memory access requests, for example, due to a combined current memory access pattern matching a combined previous memory access request corresponding with the sequence of previous memory access requests. When such instances occur, in some embodiments, a (e.g., processor-side and/or memory-side) memory controller may predict a subsequent memory access pattern with increased confidence. In fact, due to the increased confidence in its prediction, in some embodiments, the memory controller may increase the amount of pre-fetched data, for example, by increasing sequence length (e.g., duration) of the predicted subsequent memory access pattern.

However, in other instances, different types of current memory access patterns may be matched to previous memory access patterns corresponding with different sequences of previous memory access requests. When such instances occur, in some embodiments, a memory controller may vary priority of the different matches. For example, as described above, the memory controller may prioritize with a longer sequence length match over a shorter sequence length match and, thus, predict a subsequent memory access pattern based on the memory access pattern directly following the longer sequence length match. As another example, the memory controller may prioritize a data value memory access pattern match over an inter-demand delay memory access pattern match and, thus, predict a subsequent memory access pattern based on the memory access pattern directly following the data value memory access pattern match. As further example, the memory controller may prioritize a combined (e.g., signature) memory access pattern match over a data value memory access pattern match and an inter-demand delay memory access pattern match and, thus, predict a subsequent memory access pattern based on the memory access pattern directly following the combined memory access pattern match.

In fact, to facilitate further improving efficacy (e.g., coverage and/or accuracy) of predictive data pre-fetching techniques, in some embodiments, a memory controller may adaptively (e.g., dynamically) adjust priority associated with different types of matches. To facilitate adaptively adjusting priority, in some embodiments, the memory controller may determine accuracy (e.g., percentage actually subsequently demanded) of data previously pre-fetched using a current priority. When the accuracy is below an accuracy (e.g., percentage) threshold, the memory controller may adjust the current priority, for example, such that an inter-demand delay memory access pattern match is prioritized over a data value memory access pattern match. At least in some instances, adaptively adjusting priority of different types of memory access pattern matches may facilitate improving data pre-fetching coverage, for example, by enabling different subsequent memory access patterns to be predicted. In this manner, as will described in more detail below, implementing and/or operating a memory sub-system in accordance with the present disclosure may facilitate improving efficacy (e.g., coverage and/or accuracy) of predictive data pre-fetching techniques, which, at least in some instances, may facilitate improving operational efficiency of a computing system in which the memory sub-system is deployed, for example, by increasing likelihood that demanded data is retrieved from a lower (e.g., cache and/or pre-fetch buffer) memory level instead of a higher (e.g., memory array) memory level and/or by reducing likelihood that pre-fetched data pollutes the lower memory level.

To help illustrate, an example of a computing system 10 (e.g., apparatus), which includes a processing sub-system 12 (e.g., system) and a memory sub-system 14 (e.g., system), is shown in FIG. 1. It should be appreciated that the depicted example is merely intended to be illustrative and not limiting. In particular, the computing system 10 may additionally or alternatively include other computing sub-systems. For example, the computing system 10 may additionally include a networking sub-system, a radio frequency sub-system, a user input sub-system, and/or a display sub-system.

Moreover, in some embodiments, the computing system 10 may be implemented in a single electronic device, such as a desktop computer, a workstation computer, a laptop computer, a server, a mobile phone, a virtual-reality headset, and/or the like. In other embodiments, the computing system 10 may be distributed between multiple electronic devices. For example, the processing sub-system 12 and the memory sub-system 14 may be implemented in a host device while other computing sub-systems, such as the user input sub-system and/or the display sub-system, may be implemented in a client (e.g., remote) device. In fact, in some embodiments, a computing sub-system may be distributed between multiple electronic devices. For example, a first portion of the processing sub-system 12 and/or a first portion of the memory sub-system 14 may be implemented in a host device while a second portion of the processing sub-system 12 and/or a second portion of the memory sub-system 14 may be implemented in a client device.

In any case, during operation of the computing system 10, the processing sub-system 12 generally performs various operations, for example, to determine output data by executing instructions in a processor to perform a corresponding data processing operation on input data. Thus, as in the depicted example, the processing sub-system 12 may include processing circuitry 16. In some embodiments, the processing circuitry 16 may be included in one or more central processing units (CPUs), one or more graphics processing units (GPUs), one or more processor cores, or any combination thereof.

Additionally, as in the depicted example, the processing sub-system 12 may include one or more registers 22. In some embodiments, a register 22 may provide one or more storage (e.g., register) locations directly accessible to the processing circuitry 16. However, storage capacity of the registers 22 is generally limited. Thus, as in the depicted example, the processing sub-system 12 may be communicatively coupled to the memory sub-system 14, which provides additional data storage capacity, via one or more communication buses 20. In some embodiments, a communication bus 20 may include one or more cables, one or more wires, one or more conductive traces, one or more communication networks, or any combination thereof.

In other words, the processing sub-system 12 and the memory sub-system 14 may communicate via the one or more communication buses 20. For example, the processing sub-system 12 may communicate (e.g., output or transmit) data along with a write memory access request that demands (e.g., requests or targets) storage of the data in the memory sub-system 14 and/or a read memory access request that demands return of data stored in the memory sub-system 14. Additionally or alternatively, the memory sub-system 14 may communicate (e.g., output or return) target data stored therein to the processing sub-system 12, for example, in response to a read memory access request to enable processing and/or execution by the processing circuitry 16 of the processing sub-system 12.

To provide data storage, as in the depicted example, the memory sub-system 14 may include one or more memory devices 18 (e.g., chips or integrated circuits). As will be described in more detail below, the memory devices 18 may include memory cells (e.g., circuitry) organized into one or more memory arrays 28 and, thus, may include one or more tangible, non-transitory, computer-readable media. For example, the memory sub-system 14 may include one or more memory device 18 communicatively coupled to the processing sub-system 12 via an external communication (e.g., memory) bus 20.

However, data communication via an external communication bus 20 is generally slower than data communication within a processor-side of the external communication bus 20 and/or data communication within a memory-side of the external communication bus 20. At least in some instances, the difference in communication speed and, thus, resulting data retrieval latency may be due at least in part to the external communication bus 20 being shared with other computing sub-systems, timing differences between components on the processor-side of the external communication bus 20 and components on the memory-side of the external communication bus 20, and/or communication distance between the processor-side of the external communication bus 20 and the memory-side of the external communication bus 20.

To facilitate improving provided data access speed, as in the depicted example, the memory sub-system 14 may include one or more caches 24, which provide faster data access speed compared to the memory devices 18. In some embodiments, a cache 24 may provide storage (e.g., cache) locations organized into one or more cache lines 30, for example, to store an instance (e.g., copy) of data also stored in a memory array 28 implemented in one or more memory devices 18. Accordingly, in some embodiments, a cache 24 may be communicatively coupled between a memory device 18 and the processing circuitry 16 of the processing sub-system 12 and/or used to implement a lower memory layer compared to a memory array 28 implemented in the memory device 18.

For example, the memory sub-system 14 may include one or more processor-side caches 24 implemented on a processor-side of an external communication (e.g., memory) bus 20. In some embodiments, one or more of the processor-side caches 24 may be integrated with the processing circuitry 16. For example, the processor-side caches 24 may include a level one (L1) cache, a level two (L2) cache, and/or a level three (L3) cache implemented along with the processing circuitry 16 in a processor chip. In fact, in some embodiments, a (e.g., processor-side) memory controller 34 may additionally be implemented in the processor chip. Additionally or alternatively, the memory sub-system 14 may include one or more memory-side caches 24 implemented on a memory-side of the external communication bus 20. In other words, in some embodiments, a memory sub-system 14 may include a first (e.g., processor-side) portion implemented on a processor-side of an external communication (e.g., memory) bus 20 and a second (e.g., memory-side) portion implemented on a memory-side of the external communication bus 20.

In some embodiments, the computing system 10 may additionally include one or more pre-fetch buffers 32, which provide faster data access speeds compared to the memory devices 18. For example, a processor-side of the memory sub-system 14 may include a processor-side pre-fetch buffer 32 distinct (e.g., separate) from its processor-side caches 24. Additionally or alternatively, the memory-side of the memory sub-system 14 may include a memory-side pre-fetch buffer 32 distinct (e.g., separate) from its memory-side caches 24.

Furthermore, in some embodiments, a pre-fetch buffer 32 may provide storage (e.g., buffer) locations organized into one or more buffer lines 33, for example, to store an instance (e.g., copy) of data pre-fetched (e.g., retrieved before demanded) from a memory array 28 implemented in one or more memory devices 18. Accordingly, in some embodiments, a pre-fetch buffer 32 may be communicatively coupled between a memory device 18 and the processing circuitry 16 of the processing sub-system 12 and/or used to implement a lower memory level compared to a memory array 28 implemented in the memory device 18. Moreover, in some embodiments, data pre-fetched to a pre-fetch buffer 32 may be subsequently transferred to a cache 24. Thus, at least in such embodiments, the pre-fetch buffer 32 may be communicatively coupled between the cache 24 and a memory device 18 and/or used to implement a higher memory level compared to the cache 24. In other embodiments, pre-fetched data may be directly stored into a cache 24 and, thus, the pre-fetch buffer 32 may be obviated (e.g., optional) and not included in the computing system 10, for example, to facilitate reducing implementation associated cost, such as component count and/or physical footprint (e.g., size).

In any case, to facilitate controlling data storage therein, the memory sub-system 14 may include one or more memory controllers (e.g., control logic and/or control circuitry) 34, for example, communicatively coupled to the caches 24, the pre-fetch buffers 32, and/or the memory devices 18 via a (e.g., instruction) communication bus 20. As in the depicted example, in some embodiments, a memory controller 34 may be implemented using multiple controllers (e.g., control logic and/or control circuitry), such as a cache controller 36, a pre-fetch controller 38, a main memory controller 40, or any combination thereof. Generally, a main memory controller 40 may be implemented and/or operated to control data storage in one or more memory array 28 and, thus, corresponding memory array (e.g., higher) memory levels. For example, in some embodiments, the main memory controller 40 may include a dynamic random-access memory (DRAM) memory controller 34 implemented and/or operated to control data storage in one or more DRAM memory arrays 28.

Additionally, a cache controller 36 may generally be implemented and/or operated to control data storage in one or more caches 24 and, thus, corresponding cache (e.g., lower) memory levels. For example, the cache controller 36 may instruct a cache 24 to store a copy (e.g., instance) of data that is retrieved from a memory array 28 in response to a read memory access request. Additionally or alternatively, the cache controller 36 may instruct a cache 24 to store a copy of data that is stored to the memory array 28 in response to a write memory access request.

Furthermore, in some embodiments, a pre-fetch controller 38 may be implemented and/or operated to control data storage in one or more pre-fetch buffers 32 and, thus, corresponding pre-fetch (e.g., lower) memory levels. Additionally or alternatively, a pre-fetch controller 38 may facilitate predictively pre-fetching data from a higher (e.g., memory array) memory level to a lower (e.g., cache and/or pre-fetch buffer) memory level, for example, by determining (e.g., predicting) a subsequent memory access pattern and identifying one or more data blocks targeted by the subsequent memory access pattern as candidate pre-fetch data.

Moreover, as described above, in some embodiments, a memory sub-system 14 may include a processor-side portion and a memory-side portion coupled via an external communication (e.g., memory) bus 20. Thus, in some embodiments, the memory sub-system 14 may include one or more memory controllers 34 implemented on a memory-side of the external communication bus 20, for example, as a memory-side memory controller 34. Additionally or alternatively, the memory sub-system 14 may include one or more memory controller 34 implemented on a processor-side of the external communication bus 20, for example, as a processor-side memory controller 34.

Figure 2:
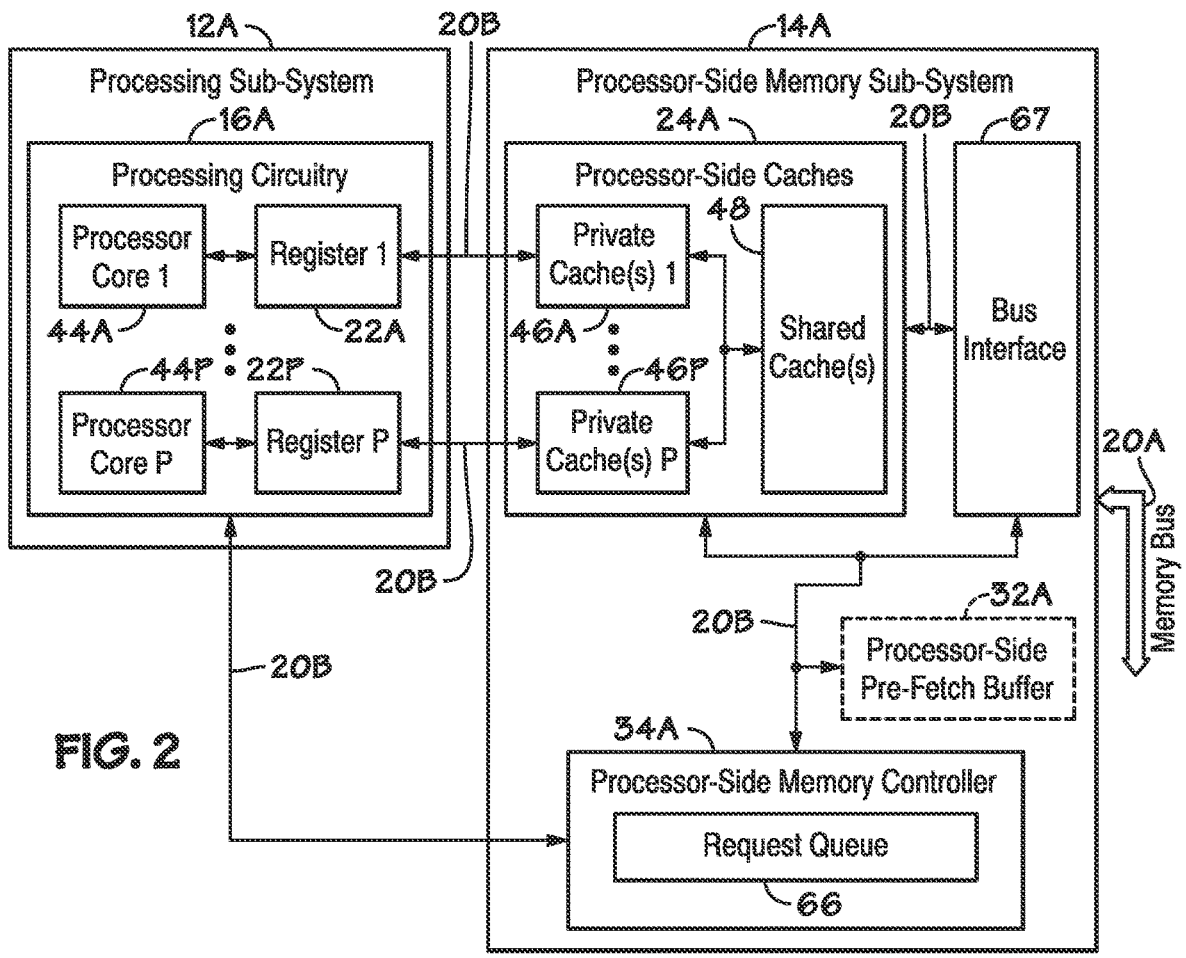
FIG. 2 is a block diagram of an example of the processing sub-system of FIG. 1 and a processor-side of the memory sub-system of FIG. 1, in accordance with an embodiment of the present disclosure.

To help illustrate, an example of a processor-side of a computing system 10, which includes a processing sub-system 12A and a processor-side memory sub-system 14A coupled to a memory bus 20A, is shown in FIG. 2. As described above, in some embodiments, processing circuitry 16 of a processing sub-system 12 may be implemented using one or more processor cores 44. For example, the processing circuitry 16A in the processing sub-system 12A may include at least a first processor core 44A and a Pth processor core 44P. However, it should appreciated that the depicted example is merely intended to be illustrative and not limiting. For example, in other embodiments, a processing sub-system 12 may include a single processor core 44 or more than two (e.g., four, eight, or sixteen) processor cores 44.

Additionally, as described above, in some embodiments, a processing sub-system 12 may include one or more registers 22, which provide storage locations directly accessible to its processing circuitry 16. For example, the processing sub-system 12A may include at least a first register 22A, which provides a storage location directly accessible to the first processor core 44A, and a Pth register 22P, which provides a storage location directly accessible to the Pth processor core 44P. To facilitate increasing storage capacity provided on the processor-side of the memory bus 20A, as described above, a processor-side memory sub-system 14A may include one or more processor-side caches 24A and/or a processor-side pre-fetch buffer 32A. In some embodiments, a processor-side cache 24A and/or the processor-side pre-fetch buffer 32A may be implemented using volatile memory, such as static random-access memory (SRAM) and/or dynamic random-access memory (DRAM).

Furthermore, in some embodiments, the processor-side caches 24A may be organized to implement one or more hierarchical (e.g., cache and/or buffer) memory levels. For example, the processor-side caches 24A may include private processor-side caches 46, which may be used to implement one or more processor-side lower (e.g., lowest) memory levels, and a shared processor-side cache 48, which may be used to implement a processor-side higher (e.g., intermediate) memory level. In some embodiments, the data storage provided by the shared processor-side cache 48 may be shared by at least the first processor core 44A and the Pth processor core 44P. For example, the shared processor-side cache 48 may include one or more level three (L3) processor-side caches 24A.

On the other hand, in some embodiments, the data storage provided by a private processor-side cache 46 may be dedicated to a corresponding processor core 44. For example, a first one or more private processor-side caches 46A may include a level one (L1) processor-side cache 24A dedicated to the first processor core 44A and a level two (L2) processor-side cache 24A dedicated to the first processor core 44A. Additionally or alternatively, a Pth one or more private processor-side caches 46P may include a level one (L1) processor-side cache 24A dedicated to the Pth processor core 44P and a level two (L2) processor-side cache 24A dedicated to the Pth processor core 44P.

In any case, a processor-side memory controller 34A may generally control data storage in the processor-side of the computing system 10. In other words, in some embodiments, the processor-side memory controller 34A may control data storage in the processor-side caches 24A, the processor-side pre-fetch buffer 32A, and/or the registers 22 implemented in the processing sub-system 12A. For example, the processor-side memory controller 34A may control data storage such that data demanded (e.g., targeted) by the processing circuitry 16A is returned to one or more of its registers 22. Thus, as in the depicted example, the processor-side memory controller 34A may be communicatively coupled to the processing circuitry 16A, the processor-side caches 24A, and/or the processor-side pre-fetch buffer 32A via one or more processor-side internal communication buses 20B, for example, to enable the processor-side memory controller 34A to determine data demanded (e.g., targeted) by the processing circuitry 16A and/or to output control (e.g., command) signals that instruct (e.g., cause) the processor-side memory sub-system 14A to adjust data storage therein.

In particular, in some embodiments, the processor-side memory controller 34A may identify a target data block, for example, which is demanded for storage (e.g., writing) in the memory sub-system 14 by the processing sub-system 12A, demanded for retrieval (e.g., reading) from the memory sub-system 14 by the processing sub-system 12A, and/or expected (e.g., predicted) to be demanded by the processing sub-system 12A during an upcoming control horizon (e.g., time period and/or one or more clock cycles). Additionally, the processor-side memory controller 34 may determine whether the target data block is currently stored in the processor-side memory sub-system 14A and, thus, whether the target data block results in a processor-side miss. Moreover, as described above, in some embodiments, a processor-side memory sub-system 14A may provide data storage via one or more processor-side lower memory levels, for example, implemented using one or more processor-side caches 24 and/or a processor-side pre-fetch buffer 32A.

Figure 3:
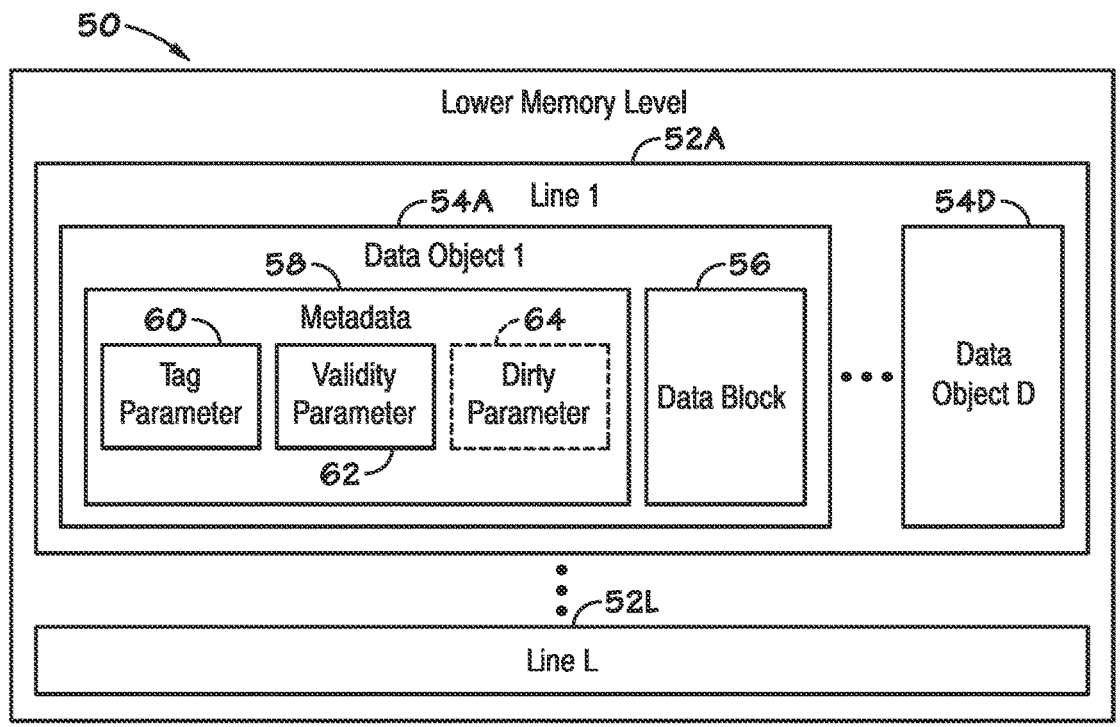
FIG. 3 is a block diagram of an example of a lower (e.g., cache and/or pre-fetch buffer) memory level implemented in the computing system of FIG. 1, in accordance with an embodiment of the present disclosure.

To help illustrate, an example of a lower (e.g., cache and/or pre-fetch buffer) memory level 50, which may be implemented in a memory sub-system 14, is shown in FIG. 3. In some embodiments, the lower memory level 50 may be a cache memory level and, thus, implemented using one or more caches 24. Additionally or alternatively, the lower memory level 50 may be a pre-fetch buffer memory level and, thus, implemented using one or more pre-fetch buffers 32.

In any case, as in the depicted example, the lower memory level 50 may provide storage locations organized into multiple lines 52 (e.g., cache lines 30 and/or buffer lines 33)—namely a first line 52A, an Lth line 52L, and so on. Additionally, as in the depicted example, storage locations included in a line 52 of the lower memory level 50 may be allocated to enable storage of one or more data objects 54, which each includes a data block 56 and associated metadata 58. For example, the first line 52A may be implemented with a line width that enables storage of D valid data objects 54 including at least a first data object 54A and a Dth data object 54D. However, it should be appreciated that the depicted example is merely intended to be illustrative and not limiting. For example, in other embodiments, a line 52 in a lower (e.g., cache and/or pre-fetch buffer) memory level 50 may be allocated with a line width that enables storage of a single valid data object 54, a single valid data block 56, more than two valid data objects 54, or more than two valid data blocks 56.

In any case, a data block 56 generally includes related data bits, for example, which are expected to be processed (e.g., analyzed and/or interpreted) together. Additionally, as in the depicted example, metadata 58 in a data object 54 may include one or more parameters associated with a corresponding data block 56 in the data object 54. For example, the metadata 58 may include a tag parameter 60, a validity parameter 62, and/or a dirty parameter 64. However, it should again be appreciated that the depicted example is merely intended to be illustrative and not limiting. For example, in other embodiments, metadata 58 in a data object 54 may include one or more other parameters, such as a transaction context parameter, associated with a corresponding data block 56 in the data object 54

In some embodiments, a validity parameter 62 included in a data object 54 may indicate the validity of a corresponding data block 56. For example, the validity parameter 62 may include a validity bit, which indicates that the data block 56 is valid when set (e.g., "1" bit or high) and invalid when not set (e.g., "0" bit or low). Additionally or alternatively, the validity parameter 62 may facilitate detecting whether the data block 56 is valid and/or correcting the data block 56 when invalid. For example, the validity parameter 62 may include one or more error checking codes, such as an inversion bit, a poison bit, a parity bit, an error-detecting code (EDC), an error-correcting code (ECC), a Bose-Chaudhuri-Hocquenghem (BCH) code, a message authentication code (MAC), a cyclic redundancy check (CRC) code, or any combination thereof.

Additionally, in some embodiments, a dirty parameter 64 included in a data object 54 may indicate whether a corresponding data block 56 has been modified relative to a version of the data block 56 stored in a higher (e.g., memory array) memory level. For example, the dirty parameter 64 may include a dirty bit, which indicates that the data block 56 has been modified when set (e.g., "1" bit or high) and that the data block 56 has not been modified when not set (e.g., "0" bit or low). In other words, at least in such embodiments, the dirty parameter 64 may be toggled when the data block 56 is initially modified relative to a version of the data block 56 stored in a higher memory level.

Furthermore, in some embodiments, a tag parameter 60 included in a data object 54 may facilitate identifying the data object 54 and, thus, a corresponding data block 56. In some embodiments, the value of an associated tag parameter 60 may be indicative of the storage location of the data block 56 and/or a corresponding data object 54 in an address space and, thus, may be used to identify the data block 56 and/or the data object 54. In particular, in some embodiments, the tag parameter 60 may indicate a virtual memory address of the data block 56, a physical memory address of the data block 56, or a value determined based on the virtual memory address and the physical memory address of the data block 56. In this manner, one or more lower (e.g., cache and/or pre-fetch buffer) memory level 50 may be implemented in a memory sub-system 14, for example, on a memory-side of the memory sub-system 14 and/or on a processor-side of the memory sub-system 14.

Returning to the processor-side memory sub-system 14A of FIG. 2, as in the depicted example, in some embodiments, the processor-side memory controller 34A may include a request (e.g., command) queue 66, which may be used to store memory access requests before output to the memory bus 20A. In other words, at least in such embodiments, the processor-side memory controller 34A may generate a memory access request and store the memory access request in the request queue 66. The processor-side memory sub-system 14A may then retrieve the memory access request from the request queue 66 and output the memory access request to the memory bus 20A.

To enable communication via the memory bus 20A, as in the depicted example, the processor-side memory sub-system 14A may include a processor-side bus interface 67 coupled between the memory bus 20A and the one or more processor-side internal communication buses 20B. In some embodiments, the processor-side bus interface 67 may include one or more pins, which may each be coupled to corresponding wire of the memory bus 20A. By implementing a processor-side of a computing system 10 in this manner, a processor-side memory controller 34A may be operated to control data storage in the processor-side of the computing system 10, for example, predictively during operation of the computing system 10.

Figure 4:
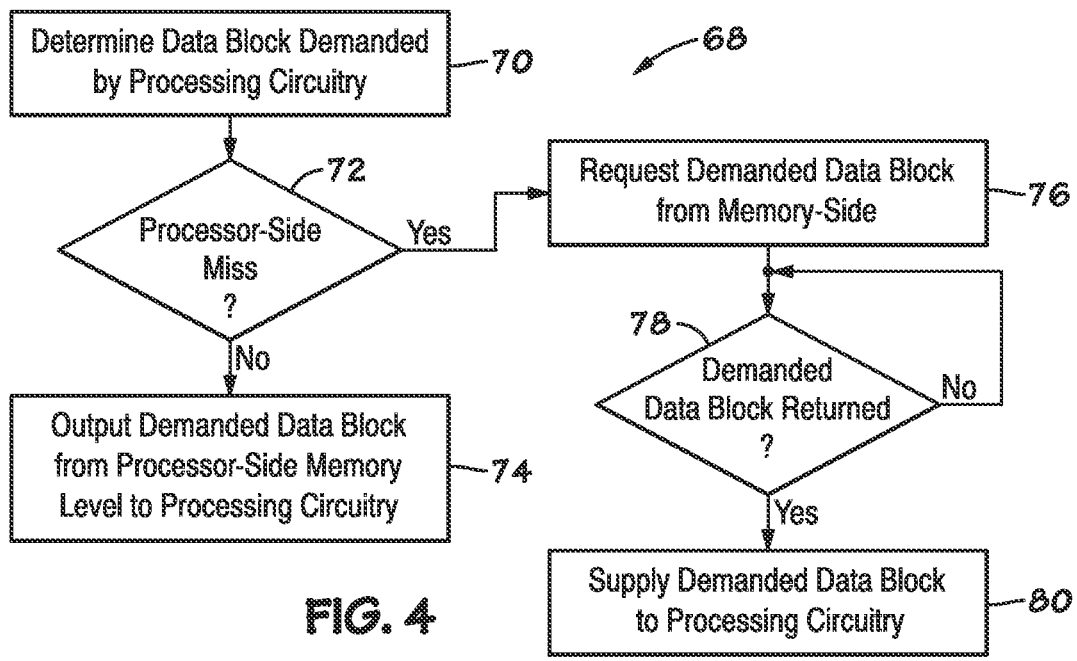
FIG. 4 is a flow diagram of an example process for operating the processor-side memory sub-system of FIG. 2, in accordance with an embodiment of the present disclosure.

To help further illustrate, an example of a process 68 for operating a processor-side of a computing system 10 is described in FIG. 4. Generally, the process 68 includes determining a data block demanded by processing circuitry (process block 70), determining whether the demanded data block results in a processor-side miss (decision block 72), and outputting the demanded data block from a processor-side memory level to the processing circuitry when the demanded data block does not result in a processor-side miss (process block 74). Additionally, when the demanded data block results in a processor-side miss, the process 68 includes requesting the demanded data block from a memory-side (process block 76), determining whether the demanded data block has been returned from the memory-side (decision block 78), and supplying the demanded data block to the processing circuitry after return from the memory-side (process block 80).

Although described in a particular order, which represents a particular embodiment, it should be noted that the process 68 may be performed in any suitable order. Additionally, embodiments of the process 68 may omit process blocks and/or include additional process blocks. Moreover, in some embodiments, the process 68 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a processor-side (e.g., cache and/or pre-fetch buffer) memory controller 34A in a processor-side memory sub-system 14A of a computing system 10 may determine a data block 56 demanded (e.g., targeted) for return by processing circuitry 16 in a processing sub-system 12 of the computing system 10 (process block 70). In some embodiments, processing circuitry 16 may identify a demanded data block 56 using a corresponding (e.g., target) virtual memory address. Based at least in part on the virtual memory address, the processor-side memory controller 34A may determine a corresponding (e.g., target) physical memory address, which identifies a storage location of the demanded data block 56 in the computing system 10.

Additionally, the processor-side memory controller 34A may determine whether the demanded data block 56 results in a processor-side miss (decision block 72). In some embodiments, a memory controller 34 may determine whether a data block 56 is stored in a lower memory level 50 based at least in part on a virtual memory address and/or a physical memory address associated with the data block 56. For example, based at least in part on its virtual memory address and physical memory address, the memory controller 34 may determine a target value of a tag parameter 60 (e.g., metadata 58) expected to be associated with the demanded (e.g., target or targeted) data block 56.

By searching valid lines 52 included in each processor-side lower (e.g., cache and/or pre-fetch buffer) memory level 50 based on the target tag parameter value, the processor-side memory controller 34A may determine whether the demanded data block 56 results in a processor-side miss. For example, when the target tag parameter value does not match a tag parameter value included in any of the processor-side lower memory levels 50, the processor-side memory controller 34A may determine that the demanded data block 56 results in a processor-side miss. On the other hand, when the target tag parameter value is included in one or more valid lines 52 of the processor-side lower memory levels 50, the processor-side memory controller 34A may determine that the demanded data block 56 results in a processor-side hit and, thus, does not result in a processor-side miss.

When the demanded data block 56 does not result in a processor-side miss, the processor-side memory controller 34A may instruct a processor-side lower (e.g., cache and/or pre-fetch buffer) memory level 50 to supply the demanded data block 56 to the processing circuitry 16, for example, to facilitate improving data retrieval speed and, thus, operational efficiency of the computing system 10 (process block 74). In particular, the processor-side memory controller 34A may instruct the processor-side lower memory level 50 to output a line 52 (e.g., cache line 30 or buffer line 33) with a valid tag parameter value that matches the target tag parameter value expected to be associated with the demanded data block 56. When stored in a higher processor-side memory level (e.g., shared processor-side cache 48), in some embodiments, the demanded data block 56 may pass through one or more processor-side lower memory levels 50 (e.g., private processor-side caches 46) before reaching the processing circuitry 16.

On the other hand, when it results in a processor-side miss, the processor-side memory controller 34A may request return of the demanded data block 56 from a memory-side of the computing system 10 (process block 76). As described above, to request return of a demanded data block 56, in some embodiments, a processor-side memory controller 34A may generate a read (e.g., demand) memory access request, which may be stored in a request queue 66 before output to a memory-side of the computing system 10 via a memory (e.g., external communication) bus 20A. Additionally, as described above, in some embodiments a processor-side bus interface 67 may be coupled between the memory bus 20A and one or more processor-side internal communication buses 20B. Thus, at least in such embodiments, the processor-side bus interface 67 may receive a memory access request via one or more processor-side internal communication buses 20B and route the memory access request to the memory bus 20A.

Once the demanded data block 56 is returned from the memory-side of the computing system 10, the processor-side memory controller 34A may instruct the processor-side memory sub-system 14A to supply the demanded data block 56 to the processing sub-system 12 (process block 80). For example, the processor-side memory controller 34A may instruct the processor-side bus interface 67 to route the demanded data block 56 from the memory bus 20A to one or more registers 22, which are directly accessible by the processing circuitry 16 of the processing sub-system 12, via one or more processor-side internal communication buses 20B. In some embodiments, the processor-side memory controller 34A may additionally instruct the processor-side memory sub-system 14A to store a copy (e.g., instance) of the demanded data block 56 in one or more processor-side caches 24A, for example, to facilitate reducing data retrieval latency if the processing circuitry 16 subsequently demands return the data block 56 again.

As described above, in some embodiments, a read memory access request that targets (e.g., demands) return of a data block 56 may include one or more read request parameters. For example, the one or more read request parameters may include a virtual memory address used by the processing circuitry 16 to identify the target data block 56 or a storage location in the memory sub-system 14 storing the target data block 56, a physical memory address (e.g., row address and column address pairing) of the storage location storing the target data block 56, size (e.g., bit depth) of the target data block 56, and/or a read enable indicator (e.g., bit). Thus, as will be described in more detail below, the memory-side of the computing system 10 may identify and return a data block 56 targeted (e.g., demanded) by a read memory access request based at least in part on the value of one or more request parameters indicated therein.

Figure 5:
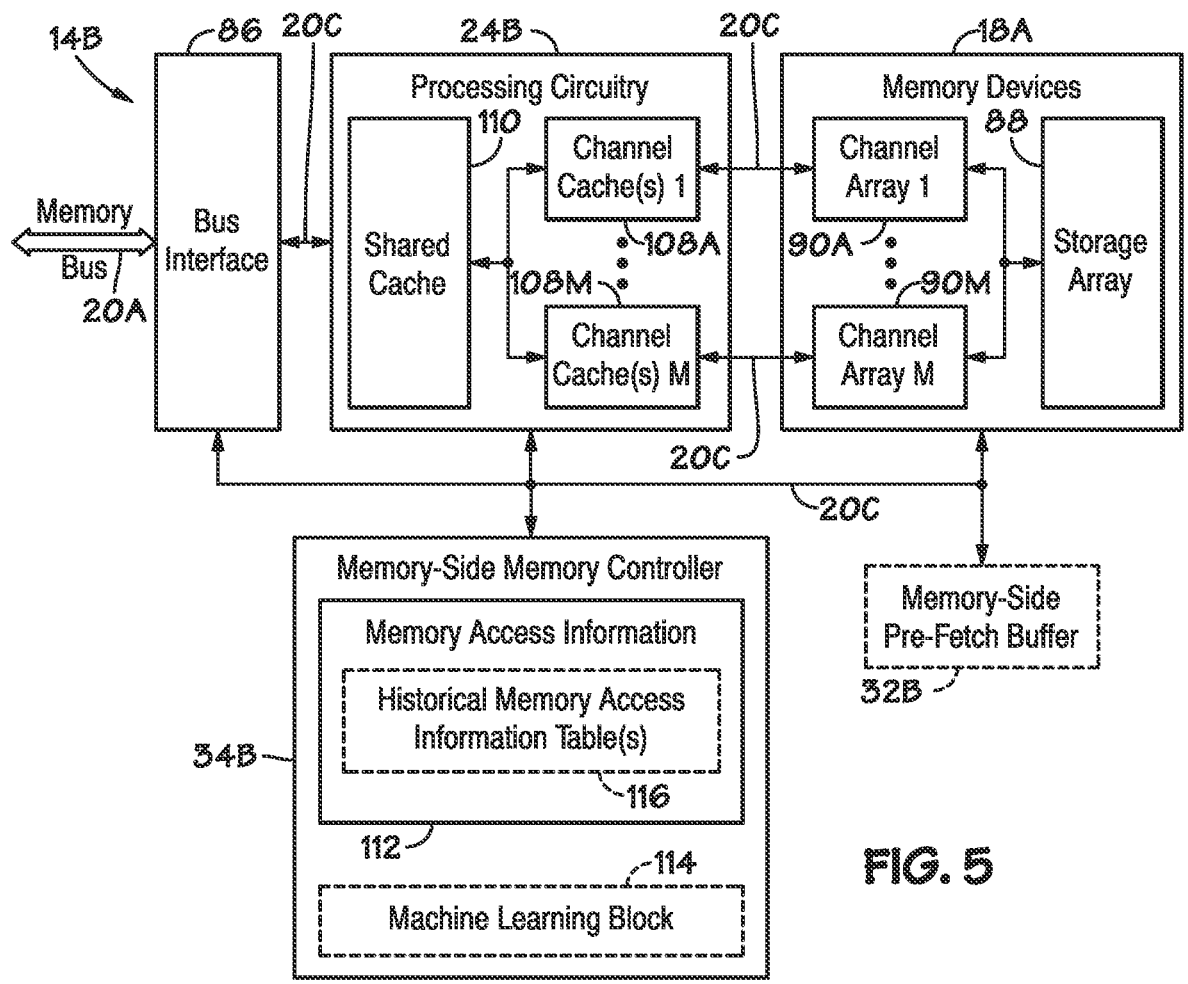
FIG. 5 is a block diagram of an example of a memory-side of the memory sub-system of FIG. 1, in accordance with an embodiment of the present disclosure.

To help illustrate, an example of a memory-side memory sub-system 14B, which may be implemented in a memory-side of a computing system 10, is shown in FIG. 5. As described above, the memory-side memory sub-system 14B and a processor-side of the computing system 10 may be communicatively coupled via a memory (e.g., external communication) bus 20A, for example, such that processing circuitry 16 in the processor-side of the computing system 10 and the memory-side memory controller 34B are communicatively coupled to opposite ends of the memory bus 20A. To facilitate communication via the memory bus 20A, as in the depicted example, the memory-side memory sub-system 14B may include a memory-side bus interface 86 coupled between the memory bus 20A and one or more memory-side internal communication buses 20C. In some embodiments, the memory-side bus interface 86 may include one or more pins, which may each be coupled to a corresponding wire of the memory bus 20A.

Additionally, as in the depicted example, the memory-side memory sub-system 14B may include one or more memory-side caches 24B, a memory-side pre-fetch buffer 32B, and one or more memory devices 18A. However, it should be appreciated that the depicted example is merely intended to be illustrative and not limiting. For example, in other embodiments, the memory-side caches 24 and/or the memory-side pre-fetch buffer 31 may be optional and, thus, not included in a memory sub-system 14.

In any case, as described above, a memory sub-system 14 may include one or more memory devices 18. For example, the memory sub-system 14 may include one or more non-volatile memory devices 18 and/or one or more volatile memory devices 18. Generally, a non-volatile memory device 18 may provide data storage using non-volatile memory. For example, a non-volatile memory device 18 may include a flash (e.g., NAND) memory device, a phase-change memory (e.g., 3D XPoint™) device, a ferroelectric random access memory (FeRAM) device, a solid state drive (SSD), a hard disk drive (HDD), or any combination thereof. On the other hand, a volatile memory device 18 may generally provide data storage using volatile memory. For example, a volatile memory device 18 may include a dynamic random-access memory (DRAM) device, a static random-access memory (SRAM) devices, or both.

Furthermore, in some embodiments, multiple memory devices 18 may be implemented on a memory module, such as a dual in-line memory module (DIMM) or a single in-line memory module (SIMM). For example, a memory module may include a printed circuit board (PCB) and multiple memory devices 18 disposed on a flat or planar (e.g., front or back) surface of the printed circuit board. Additionally, the memory devices 18 may be coupled to external pins formed along an (e.g., bottom) edge of the printed circuit board via conductive traces formed on the printed circuit board.

However, it should be appreciated that one or more of the memory devices 18 may be implemented using other packing techniques. For example, memory devices 18 may be coupled to a (e.g., silicon) interposer to implement a 2.5D configuration. Additionally or alternatively, memory devices 18 may be stacked to implement a 3D configuration. Furthermore, in some embodiments, memory devices 18 may be implemented using organic packaging techniques. In other words, in some embodiments, the techniques described in the present disclosure may be implemented as an on-package solution.

In any case, different memory types generally provide varying tradeoffs that affect operational efficiency and/or implementation associated cost, such as component count, manufacturing steps, and/or physical footprint, of a memory sub-system 14 and, thus, a computing system 10 in which the memory sub-system 14 is deployed. For example, non-volatile memory generally provides higher (e.g., greater) data storage density compared to volatile memory. Additionally, non-volatile memory cells, in contrast to volatile memory cells, may maintain storage of data even while in an unpowered state. On the other hand, volatile memory generally provides faster data access (e.g., read and/or write) speeds compared to non-volatile memory. In fact, static random-access memory (SRAM) generally provide faster data access speeds compared to dynamic random-access memory (DRAM).

Thus, to facilitate improving data access speeds, in some embodiments, a volatile memory device 18 may be used to implement a lower (e.g., smaller and faster) memory level compared to a non-volatile memory device 18, for example, which implements a highest (e.g., largest and slowest) memory level. As described above, in some embodiments, memory cells in one or more memory devices 18 may be organized into a memory array 28 to implement a corresponding memory level. For example, non-volatile memory cells in the memory-side memory sub-system 14B may be organized into a storage memory array 88 corresponding with a storage (e.g., highest and/or non-volatile) memory level in the memory sub-system 14.

Additionally, in some embodiments, volatile memory cells may be organized into one or more memory channel memory arrays 90, for example, each corresponding with a different memory (e.g., DRAM) channel. As an illustrative example, volatile memory cells in the memory-side memory sub-system 14B may be organized into a first memory channel memory array 90A corresponding with a first memory channel. Additionally or alternatively, volatile memory cells in the memory-side memory sub-system 14B may be organized into an Mth memory channel memory array 90M corresponding with an Mth memory channel.

Figures 6, 7:
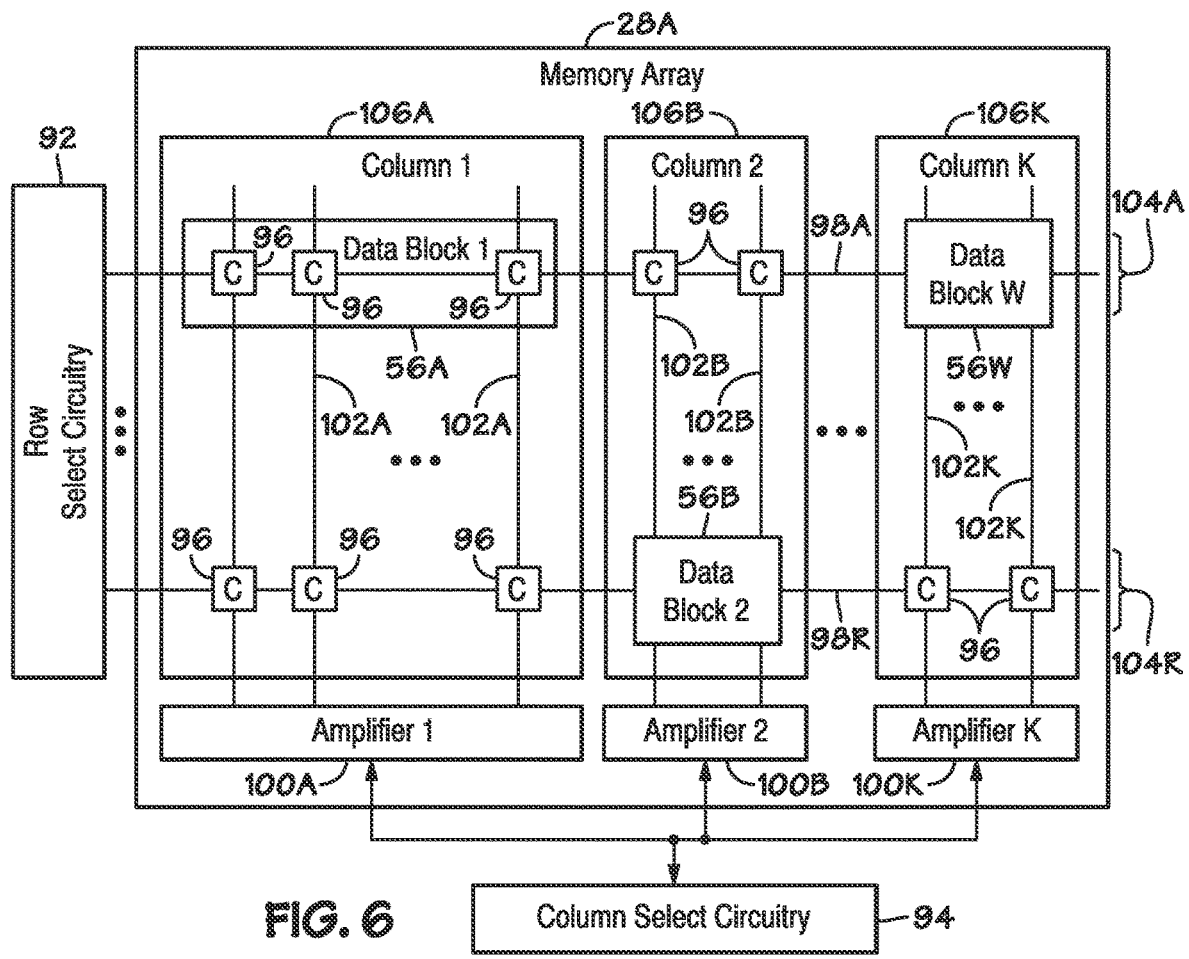
FIG. 6 is a block diagram of an example memory array implemented in the memory-side memory sub-system of FIG. 5, in accordance with an embodiment of the present disclosure.
FIG. 7 is a diagrammatic representation of an example historical memory access information table used by the memory-side memory sub-system of FIG. 5, in accordance with an embodiment of the present disclosure.

An example of a memory array 28A, which may be implemented in one or more memory devices 18, is shown in FIG. 6. As in the depicted example, the memory array 28A may be coupled to memory array control circuitry—namely row select (e.g., decoder) circuitry 92 and column select (e.g., decoder) circuitry 94. Additionally, as in the depicted example, the memory array 28A may include memory cells 96 coupled to the row select circuitry 92 via word lines 98 formed in a first (e.g., horizontal) direction and to amplifier circuitry 100 via bit lines 102 formed in a second (e.g., vertical) direction.

In some embodiments, each memory cell 96 may include a switching component, such as a metal-oxide-semiconductor field-effect transistor (MOSFET), and a storage component, such as a capacitor. For example, a memory cell 96 may be implemented such that its MOSFET is coupled between a bit line 102 and its storage capacitor and the gate of its MOSFET is coupled to a word line 98. As such, in some embodiments, each memory cell 96 may be used to store one bit of data. For example, a memory cell 96 may indicate a 1-bit (e.g., logic high bit) when charge stored therein results in a voltage greater than a threshold voltage. On the other hand, the memory cell 96 may indicate a 0-bit (e.g., logic low bit) when charge stored therein results in a voltage less than the threshold voltage. In other embodiments, a memory cell 96 may be implemented to store multiple bits of data. For example, a memory cell 96 in Quad-Level Cell (QLC) NAND memory may be implemented to store two bits of data.

In any case, as in the depicted example, the memory cells 96 may be organized into one or more memory cell rows 104 (e.g., memory pages), which may each be identified by a corresponding row (e.g., page) address, and one or more memory cell columns 106, which may each be identified by a corresponding column address. In some embodiments, a memory cell row 104 may include each of the memory cells 96 coupled to a (e.g., one) word line 98. For example, a first memory cell row 104A (e.g., first memory page) may include each of the memory cells 96 coupled to a first word line 98A and an Rth memory cell row 104R (e.g., Rth memory cell page) may include each of the memory cells 96 coupled to an Rth word line 98R.

As in the depicted example, organizing the memory array 28A in this manner may enable memory cells 96 to be grouped into storage (e.g., memory) locations suitable for storage of data blocks 56. For example, a first data block 56A may be stored at a first storage location including the memory cells 96 in the first memory cell row 104A and a first memory cell column 106A, a second data block 56B may be stored at a second storage location including the memory cells 96 in the Rth memory cell row 104R and a second memory cell column 106B, and a Wth data block 56W may be stored at a Wth storage location including the memory cells 96 in the first memory cell row 104A and the Kth memory cell column 106K. In other embodiments, the memory cells 96 in a memory array 28 are to be grouped into one or more storage locations suitable for storage of a data object 54, which includes a data block 56 and corresponding metadata 58.

In any case, as described above, row select circuitry 92 may be connected to memory cell row 104 (e.g., memory pages) of the memory array 28A via corresponding word lines 98. To enable access to (e.g., reading from and/or writing to) storage locations in a memory page, the row select circuitry 92 may activate the memory cells 96 included in the memory page. For example, in some embodiments, the row select circuitry 92 may pre-charge a memory page (e.g., memory cell row 104) by outputting a pre-charge control signal via a corresponding word line 98 and, subsequently, activate the memory page by outputting an activation (e.g., logic high) control signal via the corresponding word line 98, which causes the switching component of each memory cell 96 in the memory page to electrically couple (e.g., connect) its storage component to a corresponding bit line 102.

Moreover, as in the depicted example, column select circuitry 94 may be coupled to memory cell columns 106 via corresponding amplifier circuitry 100. In other words, as in the depicted example, the column select circuitry 94 may be coupled to the first memory cell column 106A via first bit lines 102A and first amplifier circuitry 100A, the second memory cell column 106B via second bit lines 102B and second amplifier circuitry 100B, the Kth memory cell column 106K via Kth bit lines 102K and Kth amplifier circuitry 100K, and so on. In some embodiments, amplifier circuitry 100 may include a driver amplifier that facilitates storing (e.g., writing) data into the memory cells 96 and/or a sense amplifier that facilitates outputting (e.g., reading) data from the memory cells 96.

Additionally, in some embodiments, the column select circuitry 94 may selectively enable access to (e.g., reading from and/or writing to) a storage location in an activated memory page (e.g., memory cell row 104), for example, by outputting a column select (e.g., logic high) control signal to corresponding amplifier circuitry 100. In other words, to read data (e.g., first data block 56A) from and/or to write data to a storage location in the first memory cell column 106A, the column select circuitry 94 may output a column select control signal to the first amplifier circuitry 100A. Similarly, to read data (e.g., second data block 56B) from and/or to write data to a storage location in the second memory cell column 106B, the column select circuitry 94 may output a column select control signal to the second amplifier circuitry 100B. Furthermore, to read data (e.g., Wth data block 56) from and/or to write data to a storage location in the Kth memory cell column 106K, the column select circuitry 94 may output a column select control signal to the Kth amplifier circuitry 100K. In this manner, memory cells 96 in one or more memory devices 18 may be organized to implement a memory array 28 in a memory sub-system 14.

Returning to the memory-side memory sub-system 14B of FIG. 5, in addition to memory arrays 28, as in the depicted example, the memory-side memory sub-system 14B may include one or more memory-side caches 24B and/or a memory-side pre-fetch buffer 32B. As described above, a memory-side cache 24B and/or a memory-side pre-fetch buffer 32B may be implemented in a memory sub-system 14 to provide a lower (e.g., cache and/or pre-fetch buffer) memory level 50 compared to a memory array 28 implemented in the memory sub-system 14. In other words, in some embodiments, a memory-side cache 24B and/or a memory-side pre-fetch buffer 32B may be implemented to, on average, provide faster data access speed compared to a memory array 28.

Thus, in some embodiments, a memory-side cache 24B and/or a memory-side pre-fetch buffer 32B may also be implemented using volatile memory. For example, the memory-side cache 24B and/or the memory-side pre-fetch buffer 32B may be implemented with static random-access memory (SRAM) while a volatile memory array 28 is implemented with dynamic random-access memory (DRAM). Additionally or alternatively, the memory-side cache 24B and/or the memory-side pre-fetch buffer 32B may be implemented using the same memory type (e.g., DRAM) as a volatile memory array 28. In fact, in some embodiments, one or more memory-side caches 24 may be implemented in a volatile memory device 18.

Moreover, in some embodiments, the memory-side caches 24B may be hierarchically organized. For example, the memory-side caches 24B may include one or more memory channel caches 108 and a shared memory-side cache 110. In some embodiments, a memory channel cache 108 may be dedicated to a corresponding memory channel while the shared memory-side cache 110 may be shared between multiple memory channels. For example, a first one or more memory channel caches 108A may be dedicated to a first memory channel implemented by the first memory channel memory array 74A while an Mth one or more memory channel caches 108M may be dedicated to an Mth memory channel implemented by the Mth memory channel memory array 74M. On the other hand, the shared memory-side cache 110 may be shared at least by the first memory channel and the Mth memory channel. Thus, in some embodiments, the shared memory-side cache 110 may be implemented to provide a lower (e.g., lowest) memory level 50 in the memory-side memory sub-system 14B compared to a memory channel cache 108.

In any case, a memory-side memory controller 34B may generally control data storage in the memory-side memory sub-system 14B. For example, the memory-side memory controller 34B may control whether data is stored in a memory-side cache 24B, the memory-side pre-fetch buffer 32B, a volatile memory device 18, a non-volatile memory device 18, or any combination thereof. In other words, in some embodiments, the memory-side memory controller 34B may control whether the data is stored in a (e.g., lowest memory-side) memory level provided by a memory-side cache 24B, a (e.g., lower intermediate) memory level provided by the memory-side pre-fetch buffer 32B, a (e.g., higher intermediate) memory level provided by a volatile memory array 28 implemented at least in part in a volatile memory device 18, a (e.g., highest) memory level provided by a non-volatile memory array 28 implemented at least in part in a non-volatile memory device 18, or any combination thereof. Thus, as in the depicted example, the memory-side memory controller 34B may be communicatively coupled to the memory-side caches 24B, the memory-side pre-fetch buffer 32B, and/or the memory devices 18A via one or more memory-side internal communication buses 20C, for example, to enable the memory-side memory controller 34B to search for target data and/or to output control (e.g., command) signals that instruct (e.g., cause) the memory-side memory sub-system 14B to adjust data storage therein.

As will be described in more detail below, to facilitate improving computing system operational efficiency, in some embodiments, a (e.g., memory-side and/or processor-side) memory controller 34 may predictively (e.g., preemptively) control (e.g., adjust) data storage in a memory sub-system 14. For example, the memory controller 34 may predict a subsequent memory access pattern that will occur during an upcoming (e.g., subsequent) control horizon (e.g., one or more clock cycles or time period) and identify a data block 56 stored at a storage location (e.g., memory address) targeted by the predicted memory access pattern as a candidate pre-fetch data block 56. Additionally, when the candidate pre-fetch data block 56 is not already stored in a lower (e.g., cache and/or pre-fetch buffer) memory level 50, the memory controller 34 may identify the candidate pre-fetch data block 56 as a target pre-fetch data block 56 to be pre-fetched from a higher (e.g., memory array) memory level to the lower memory level 50, thereby enabling the data block 56, if subsequently demanded, to be supplied from the lower memory level 50 instead of the higher memory level.

Since memory access patterns are often somewhat cyclical (e.g., repetitive), in some embodiments, a (e.g., memory-side and/or processor-side) memory controller 34 may predict a subsequent memory access pattern based at least in part on memory access information 112 associated with one or more memory access requests fulfilled prior to the subsequent memory access pattern. In other words, to facilitate predictively controlling data storage, the memory controller 34 may historically track memory access information 112 associated with memory access requests. To facilitate tracking memory access information 112, in some embodiments, the memory controller 34 may utilize a machine learning block 114, for example, which implements neural network techniques, such as recurrent neural network (RNN) techniques and/or long short-term memory (LSTM) techniques. Additionally or alternatively, the memory controller 34 may explicitly track the memory access information 112 via one or more historical memory access information tables 116.

To help illustrate, an example of a historical memory access information table 116A, which may be determined and/or utilized by a (e.g., processor-side or memory-side) memory controller 34, is shown in FIG. 7. As in the depicted example, the historical memory access information table 116A may include one or more table entries (e.g., rows) 118. Additionally, as in the depicted example, each table entry 118 may include a memory address parameter field (e.g., column) 120 and one or more correlation parameter fields (e.g., columns) 122. However, it should be appreciated that the depicted example is merely intended to be illustrative and not limiting. For example, in other embodiments, a historical memory access information table 116 may additionally or alternatively include other types of data, fields, and/or information.

With regard to the depicted example, each table entry 118 in the historical memory access information table 116A may be associated with a memory access request previously fulfilled by a memory sub-system 14 or a memory access request currently being fulfilled by the memory sub-system 14. In other words, in some embodiments, a (e.g., memory-side and/or processor-side) memory controller 34 may determine a table entry 118 associated with a memory access request for inclusion in the historical memory access information table 116A, for example, in response to receipt and/or fulfillment of the memory access request. That is, as will be described in more detail below, the memory controller 34 may determine a memory address parameter to be indicated in a memory address parameter field 120 of the table entry 118 and one or more correlation parameters to be indicated in a correlation parameter field 122 of the table entry 118.

To facilitate associating a table entry 118 with a memory access request, in some embodiments, a table entry 118 may be generated to identify a storage location targeted by the memory access request in its memory address parameter field 120. For example, a first table entry 118A may include a first memory address parameter, which identifies a first storage location targeted by a first memory access request, in its memory address parameter field 120, thereby indicating that the first table entry 118A is associated with (e.g., results from) the first memory access request. Additionally, a second table entry 118B may include a second memory address parameter, which identifies a second storage location targeted by a second memory access request, in its memory address parameter field 120, thereby indicating that the second table entry 118B is associated with (e.g., results from) the second memory access request. Furthermore, a third table entry 118C may include a third memory address parameter, which identifies a third storage location targeted by a third memory access request, in its memory address parameter field 120, thereby indicating that the third table entry 118C is associated with (e.g., results from) the third memory access request.

As described above, a table entry 118 may associate a storage location (e.g., memory address) identified in its memory address parameter field 120 with one or more correlation parameters indicated in its correlation parameter fields 122. For example, a table entry 118 associated with a memory access request may include a data value correlation parameter field 122, which may be used to indicate a data value correlation parameter determined based at least in part on data bits used to indicate a raw data value in a data block 56 targeted by the memory access request for storage (e.g., writing) to or retrieval from a storage location identified in its memory address parameter field 120. Additionally or alternatively, a table entry 118 may include an inter-demand delay correlation parameter field 122, which may be used to indicate an inter-demand delay correlation parameter determined based at least in part on a demand (e.g., receipt and/or transmission) time of a memory access request targeting the storage location identified in its memory address parameter field 120. Furthermore, in some embodiments, a table entry 118 associated with a memory access request may include an inter-demand address stride correlation parameter field 122, which may be used to indicate a stride length (e.g., distance) between a storage location targeted by the memory access request and a storage location targeted by a (e.g., directly) previous memory access request.

As described above, in some embodiments, one or more correlation parameters associated with a memory access request may indicate transaction context of the memory access request. In some embodiments, transaction context of a memory access request may be explicitly identified via one or more transaction context parameters indicated in corresponding transaction context correlation parameter fields 122 of an associated (e.g., corresponding) table entry 118. For example, the table entry 118 may include a first transaction context correlation parameter field 122, which may be used to indicate a processor context parameter that identifies a processor associated with the storage location targeted by the memory access request, a second transaction context correlation parameter field 122, which may be used to indicate a processor core context parameter that identifies a processor core 44 associated with the storage location targeted by the memory access request, a third transaction context correlation parameter field 122, which may be used to indicate an application context parameter that identifies an application associated with the storage location targeted by the memory access request, a fourth transaction context correlation parameter field 122, which may be used to indicate an application instruction context parameter that identifies an application instruction associated with the storage location targeted by the memory access request, or any combination thereof.

Generally, different sets of context parameters may correspond with different transaction contexts. In fact, in some embodiments, a set of transaction context parameters indicative of a transaction context of a memory access request may be combined to generate a combined transaction context parameter indicative of the transaction context, for example, by performing a hash operation (e.g., function) on the set of transaction context parameters. In other words, in such embodiments, a table entry 118 may include a combined (e.g., hashed) transaction context correlation parameter field 122, which may be used to indicate a combined (e.g., hashed) transaction context parameter indicative of the transaction context of a memory access request targeting the storage location identified in its memory address parameter field 120.

In other embodiments, transaction context of memory access requests may be indirectly indicated in a historical memory access information table 116, for example, by organizing the historical memory access information table 116 into multiple table sections such that each table section corresponds with a different transaction context. In other words, in such embodiments, each table section in the historical memory access information table 116 may be used to indicate table entries 118 corresponding with a different combined transaction context parameter or a different set of transaction context parameters. For example, the historical memory access information table 116A may include a first table section dedicated to indicating table entries 118 associated with memory access requests having a first transaction context, a second table section dedicated to indicating table entries 118 associated with memory access requests having a second transaction context, and so on.

However, in some embodiments, transaction context associated with memory access requests may not be explicitly communicated from a processing sub-system 12 to a memory sub-system 14. In some embodiments, a historical memory access information table 116 may nevertheless be organized into multiple table sections, for example, such that each table section corresponds with a different group (e.g., range) of storage locations (e.g., memory addresses) and/or a different type of memory access. As an illustrative example, the historical memory access information table 116A may include a first table section dedicated to indicating table entries 118 (e.g., memory access information 112) associated with memory access requests targeting storage locations included in a first group of storage locations, a second table section dedicated to indicating table entries 118 associated with memory access requests targeting storage locations included in a second (e.g., different) group of storage locations, and so on. Additionally or alternatively, the historical memory access information table 116A may include a read access table section dedicated to indicating table entries 118 associated with read memory access requests and a write access table section dedicated to indicating table entries 118 associated with write memory access requests.

To facilitate historically tracking memory access information 112, in some embodiments, table entries 118 may be indicated in a historical memory access information table 116 in accordance with a chronological fulfillment order of corresponding memory access requests, for example, relative to one or more other table entries 118 indicated in the historical memory access information table 116 and/or a corresponding table section of the historical memory access information table 116. Merely as an illustrative example, in some embodiments, the historical memory access information table 116A may be chronologically organized such that a table entry 118 associated with a memory access request is appended to another table entry 118 associated with an earlier fulfilled memory access request. For example, since the second table entry 118B associated with the second memory access request is appended to the first table entry 118A associated with the first memory access request, in such embodiments, the historical memory access information table 116A may indicate that the first memory access request is fulfilled prior to fulfillment of the second memory access request. Similarly, since the third table entry 118C associated with the third memory access request is appended to the second table entry 118B associated with the second memory access request, in such embodiments, the historical memory access information table 116A may indicate that the second memory access request is fulfilled prior to fulfillment of the third memory access request.

Moreover, in some embodiments, historically tracking memory access information 112 via a historical memory access information table 116 may enable a (e.g., memory-side and/or processor-side) memory controller 34 to determine one or more (e.g., previous, current, and/or subsequent) memory access patterns, for example, by performing a table walk operation on the historical memory access information table 116. As an illustrative example, to facilitate determining a memory access pattern ending with the third memory access request, the memory controller 34 may determine memory access information 112 indicated in the third table entry 118C associated with the third memory access request. When a target sequence length of the memory access pattern is greater than one (e.g., greater than or equal to two), the memory controller 34 may walk back chronologically from the third table entry 118C to the second table entry 118B, which is associated with the second memory access request fulfilled prior to the third memory access request, thereby enabling the memory controller 34 to determine the memory access pattern based at least in part on memory access information 112 indicated in the third table entry 118C associated with the third memory access request as well as memory access information 112 indicated in the second table entry 118B associated with the second memory access request.

In a similar manner, a historical memory access information table 116 may enable determination of a memory access pattern ending at a different memory access request and/or having a different (e.g., longer) sequence length. To help illustrate, continuing with the above example, when the target sequence length of the memory access pattern is greater than two (e.g., greater than or equal to three), the memory controller 34 may walk back chronologically from the second table entry 118B to the first table entry 118C, which is associated with the first memory access request fulfilled prior to the second memory access request, thereby enabling the memory controller 34 to determine the memory access pattern based at least in part on memory access information 112 indicated in the third table entry 118C associated with the third memory access request, memory access information 112 indicated in the second table entry 118B associated with the second memory access request, and memory access information 112 indicated in the first table entry 118A associated with the first memory access request. As described above, in some embodiments, a (e.g., processor-side and/or memory-side) memory controller 34 may additionally or alternatively track memory access information 112 via a machine learning block 114 that implements machine learning techniques, such as neural network techniques.

Figure 8:
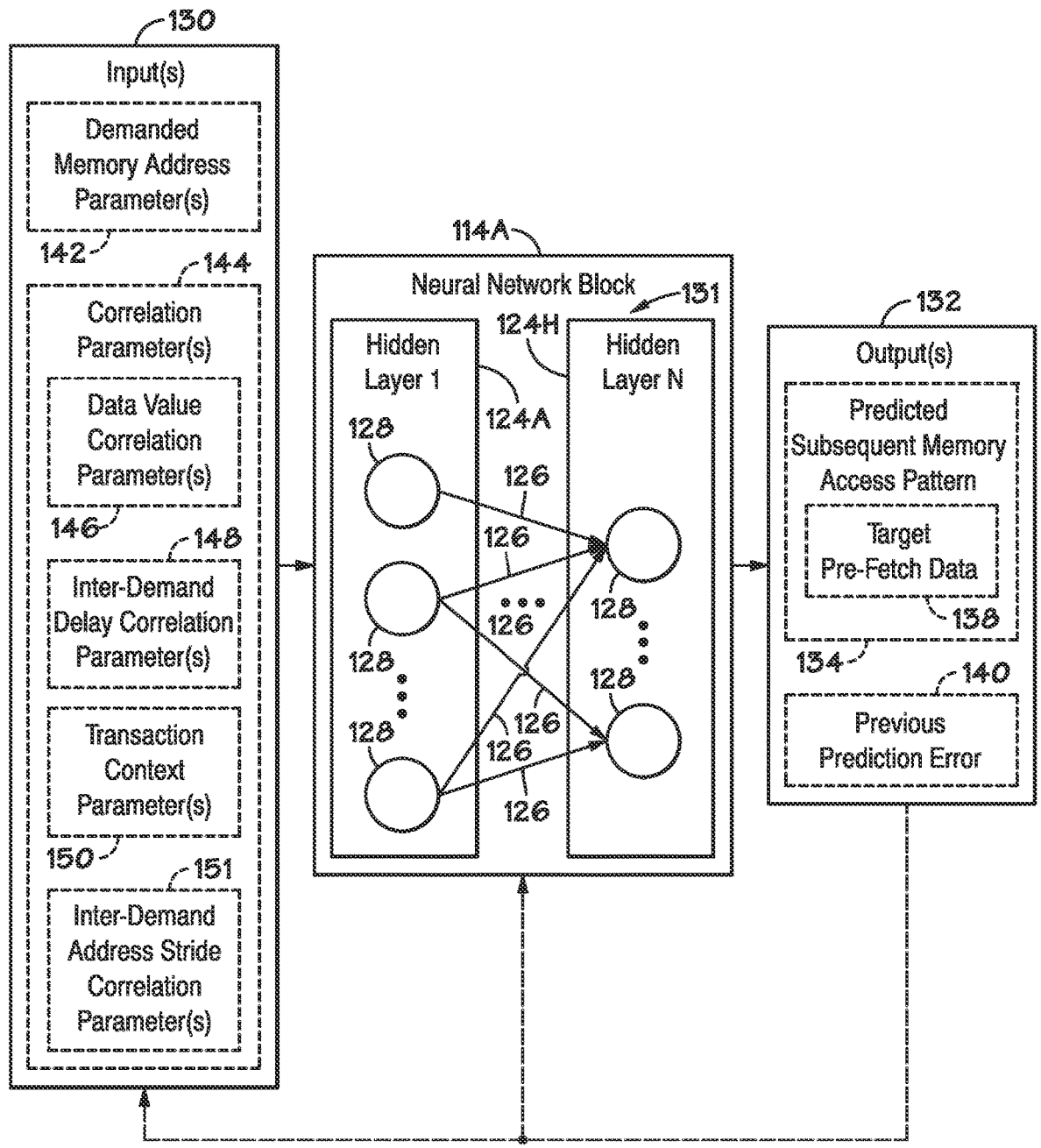
FIG. 8 is a block diagram of an example machine learning block that implements neural network pre-fetching techniques, in accordance with an embodiment of the present disclosure.

To help illustrate, an example of a machine learning block 114—namely a neural network block 114A, which implements neural network (e.g., machine learning) techniques that may be utilized by a (e.g., processor-side and/or memory-side) memory controller 34—is shown in FIG. 8. As in the depicted example, the neural network block 114A may include a neural network 131 having one or more hidden (e.g., convolution) layers 124 connected via one or more layer interconnections 126. Additionally, as in the depicted example, a hidden layer 124 may include one or more nodes 128, which each applies a weight. For example, nodes 128 in a first hidden layer 124A may apply weights to one or more input parameters 130 and output results of the weightings to a downstream hidden layer 124 via one or more layer interconnections 126. Additionally, nodes 128 in an Hth hidden layer 124H may apply weights to inputs (e.g., results received from an upstream hidden layer 124) to determine one or more output parameters 132.

However, it should be appreciated that the depicted example is merely intended to be illustrative and not limiting. In particular, in some embodiments, a neural network block 114 may implement recurrent neural network (RNN) techniques and/or long short-term memory (LSTM) techniques. Thus, in such embodiments, a neural network 131 implemented in the neural network block 114 may include one or more repeating (e.g., tanh) hidden layers 126, one or more forget gate (e.g., sigmoid) hidden layers 126, one or more input gate (e.g., sigmoid) hidden layers 126, one or more output gate (e.g., sigmoid) hidden layers 126, or any combination thereof. For example, a forget gate hidden layer 126, an input gate hidden layer 126, a repeating hidden layer 126, and an output gate hidden layer 126 may be grouped together as a cell in the neural network 131. Additionally, in such embodiments, the neural network block 114 may determine cell (e.g., internal) state information, which is selectively updated during each cycle of its neural network 131 based at least in part on a set of input parameters 130 supplied to the neural network 131.

In some embodiments, a set of input parameters 130 supplied (e.g., input) to the neural network block 114A during a cycle of its neural network 131 may include one or more demanded memory address parameters 142 and one or more correlation parameters 144. In other words, in some embodiments, a cycle of the neural network block 114A may be initialized at least in part by supplying a set of input parameters 130 to be used and/or considered by its neural network 131 during the cycle. In fact, in some embodiments, one or more output parameters 132, such as a predicted subsequent memory access pattern 134 and/or a previous prediction error 140, determined (e.g., output) during a previous cycle of the neural network 131 may be fed back for inclusion in a set of input parameters 130 supplied to the neural network 131 during a subsequent cycle.

As described above, a memory address parameter may identify a storage location in a memory sub-system 14, for example, via a corresponding absolute memory address (e.g., row address and column address pairing). Additionally, as described above, memory (e.g., read and/or write) access to a storage location in a memory array 28 of a memory sub-system 14 may be demanded (e.g., targeted and/or requested) via a demand (e.g., read and/or write) memory access request. For example, read access to a storage location in the memory array 28 may be demanded via a read (e.g., demand) memory access request when a target data block 56 stored at the demanded storage location results in a processor-side miss. As such, in some embodiments, a demanded memory address parameter 142 included in a set of input parameters 130 may identify a storage location in a memory sub-system 14 to which access has been requested, for example, during a time period subsequent to initialization of a previous cycle of the neural network 131.

Furthermore, as in the depicted example, the correlation parameters 144 included in a set of input parameters 130 may include one or more data value correlation parameters 146, one or more inter-demand delay correlation parameters 148, one or more inter-demand transaction context parameters 150, one or more inter-demand address stride correlation parameters 151, or any combination thereof. As described above, an inter-demand address stride correlation parameter 151 associated with a memory access request may be determined based at least in part on a stride length (e.g., distance) between a storage location targeted by the memory access request and a storage location targeted by a (e.g., directly) previous memory access request. Thus, in some embodiments, a set of input parameters 130 may include one or more inter-demand address stride correlation parameters 148, which each corresponds with a storage location identified by a demanded memory address parameter 142 included in the set of input parameters 130.

Additionally, as described above, an inter-demand delay correlation parameter 148 associated with a memory access request may be determined based at least in part on a duration between a demand (e.g., receipt and/or transmission) time of the memory access request and a demand time of a (e.g., directly) previous memory access request. Thus, in some embodiments, a set of input parameters 130 may include one or more inter-demand delay correlation parameters 148, which each corresponds with a storage location identified by a demanded memory address parameter 142 included in the set of input parameters 130.

Furthermore, as described above, a data value correlation parameter 146 associated with a memory access request may be determined based at least in part on data bits used to indicate a raw data value in a data block 56 that is written (e.g., stored) to or read (e.g., retrieved) from a storage location in a memory sub-system 14 in response to the memory access request. Thus, in some embodiments, a set of input parameters 130 may include one or more data value correlation parameters 146, which each corresponds with a storage location identified by a demanded memory address parameter 142 included in the set of input parameters 130. In fact, in some embodiments, multiple different data value correlation parameters 146 may be associated with the same storage location and, thus, included in the set of input parameters 130 supplied to the neural network block 114A, for example, due to the data bits used to indicate a raw data value in a target data block 56 associated with the storage location being interpreted using multiple different default interpretations.

Moreover, as described above, a set of transaction context parameters 150 may be associated with a memory access request to indicate a transaction context of the memory access request. For example, in some embodiments, the set of transaction context parameters 150 may include a processor context parameter, a processor core context parameter, an application context parameter, and/or an application instruction context parameter. Thus, in such embodiments, a set of input parameters 130 may include one or more sets of transaction context parameters 150, which are each indicative of a transaction context associated with a storage location identified by a demanded memory address parameter 142 included in the set of input parameters 130. Additionally or alternatively, as described above, a set of transaction context parameters 150 indicative of a transaction context may be combined to into a combined transaction context parameter 150 indicative of the transaction context, for example, at least in part by performing a hash operation (e.g., function) on the set of transaction context parameters 150. Thus, in such embodiments, a set of input parameters 130 may additionally or alternatively include one or more combined transaction context parameters 150, which are each indicative of a transaction context associated with a storage location identified by a demanded memory address parameter 142 included in the set of input parameters 130.

In other embodiments, transaction context of memory access requests may be indirectly considered by the neural network block 114A, for example, by implementing multiple neural networks 131 that each corresponds with a different transaction context. In other words, in such embodiments, each neural network 131 in the neural network block 114A may be implemented to determine a predicted subsequent memory access pattern 134 associated with (e.g., expected to result from) a different transaction context. For example, the neural network block 114A may include a first neural network 131 implemented to determine a first predicted subsequent memory access pattern 134 associated with a first transaction context, a second neural network 131 implemented to determine a second predicted subsequent memory access pattern 134 associated with a second (e.g., different) transaction context, and so on. Alternatively, the neural network block 114A may include single neural network 131 implemented to selectively switch between a first neural network configuration (e.g., weights) associated with a first transaction context, a second neural network configuration (e.g., weights) associated with a second transaction context, and so on.

However, as described above, in some embodiments, transaction context associated with memory access requests may not be explicitly communicated from a processing sub-system 12 to a memory sub-system 14. In some embodiments, a neural network block 114A nevertheless include multiple neural networks 131, for example, implemented such that each neural network 131 corresponds with a different type of correlation parameter 144 and/or a different type of memory access. As an illustrative example, the neural network block 114A may include a data value (e.g., first) of neural network 131 implemented to determine a data value predicted subsequent memory access pattern 134 based on the value of one or more data value correlation parameters 146 and an inter-demand delay (e.g., second) neural network 131 implemented to determine an inter-demand delay predicted subsequent memory access pattern 134 based on the value of one or more inter-demand delay correlation parameters 148. Additionally or alternatively, the neural network block 114A may include a read access (e.g., first) neural network 131 implemented to determine a read access predicted subsequent memory access pattern 134 based on memory access information 112 (e.g., demanded memory address parameters 142 and correlation parameters 144) associated with read memory access requests and a write access (e.g., second) neural network 131 implemented to determine a write access predicted subsequent memory access pattern 134 based on memory access information 112 associated with write memory access requests.

Based at least in part on a set of input parameters 130 supplied during a cycle, as a result of the cycle, the neural network 131 may determine one or more output parameters 132, such as a predicted subsequent memory access pattern 134 that is expected to occur during an upcoming (e.g., subsequent) control horizon (e.g., one or more clock cycles or time period). As described above, a memory access pattern may demand (e.g., target) return of one or more data blocks 56 stored in a memory sub-system 14. Additionally, as described above, retrieving demanded data from a lower (e.g., cache and/or pre-fetch buffer) memory level 50 is generally faster than retrieving the demanded data from a higher (e.g., memory array) memory level. As such, to facilitate improving computing system operational efficiency, one or more data blocks 56 demanded for return by the predicted subsequent memory access pattern 134 may be identified as candidate pre-fetch data, which may be considered for pre-fetching to one or more lower (e.g., cache and/or pre-fetch buffer) memory levels 50.

However, when a copy (e.g., instance) of a data block 56 is already stored in a lower memory level 50, storing an additional copy of the data block 56 in the lower memory level 50 may provide limited improvement to computing system operational efficiency and, at least in some instances, may actually reduce resulting computing system operational efficiency, for example, due to storage of the additional (e.g., redundant) copy of the data block 56 resulting in another data block 56 being prematurely evicted from the lower memory level 50 and, thus, potentially polluting the lower memory level 50. As such, in some embodiments, pre-fetching of a candidate pre-fetch data block 56 may be canceled when a valid copy of the data block 56 is already stored in one or more lower memory levels 50. On the other hand, when a valid copy of a candidate pre-fetch data block 56 is not stored in one or more lower memory levels 50, the candidate pre-fetch data block 56 may be identified as target pre-fetch data 138, which is targeted for pre-fetching from a higher (e.g., memory array) memory level to one or more lower (e.g., cache and/or pre-fetch buffer) memory levels 50.

In addition to a predicted subsequent memory access pattern 134, in some embodiments, the output parameters 132 of the neural network block 114A may additionally include a previous prediction error 140, which indicates error in a predicted subsequent memory access pattern 134 determined during a previous cycle (e.g., pass through) of the neural network 131. In other words, in some embodiments, the previous prediction error 140 may indicate accuracy of the predicted subsequent memory access pattern 134 determined during the previous cycle relative to a memory access pattern that actually occurred during a corresponding time period (e.g., one or more clock cycles). For example, the previous prediction error 140 may be determined based at least in part on the percentage of target pre-fetch data 138, which was identified from the predicted subsequent memory access pattern 134 determined during the previous cycle, was actually demanded during the corresponding time period. As such, to facilitate determining a previous prediction error 140 during a subsequent cycle of the neural network 131, in some embodiments, a predicted subsequent memory access pattern 134 resulting from the previous cycle may be fed back for inclusion in a set of input parameters 130 to be supplied to the neural network 131 during the subsequent cycle.

In fact, to facilitate improving subsequent prediction accuracy, in some embodiments, a previous prediction error 140 determined as a result of a previous cycle of the neural network 131 may also be fed back, for example, directly to the neural network 131 and/or for inclusion in a set of input parameters 130 to be supplied to the neural network 131 during a subsequent cycle. In particular, based at least in part on the previous prediction error 140 determined during the previous cycle, in some embodiments, configuration of the neural network 131 to be used during the subsequent cycle may be adaptively (e.g., dynamically) adjusted (e.g., updated), for example, by adjusting the number of hidden layers 124, the number of nodes 128 per hidden layer 124, weights applied by one or more nodes 128, and/or configuration (e.g., number and/or interconnected nodes 128) of one or more layer interconnections 126. In other words, in some embodiments, configuration (e.g., weights) of the neural network 131 may be updated using a stochastic gradient descent technique, which iteratively adjusts configuration to reduce (e.g., minimize) prediction error. Using its updated configuration, the neural network 131 may process a set of input parameters 130 supplied during the subsequent cycle to determine a predicted subsequent memory access pattern 134, which, at least in some instances, may more closely match an actual subsequent memory access pattern compared to a predicted subsequent memory access pattern 134 determined using a previous configuration of the neural network 131.

Moreover, in some embodiments, the neural network 131 may determine a predicted subsequent memory access pattern 134 during a cycle based at least in part on one or more sets of input parameters 130 supplied to the neural network 131 during one or more previous cycles. In other words, at least in such embodiments, the neural network block 114A may indirectly track memory access information 112 indicated in sets of input parameters 130 supplied during multiple different cycles of its neural network 131 and determine a predicted subsequent memory access pattern 134, which is expected to occur during an upcoming control horizon, accordingly, for example, at least in part by selectively carrying forward (e.g., retaining) cell state information to subsequent cycles. To facilitate improving computing system operational efficiency, a memory sub-system 14 may then predictively control data storage in one or more of its hierarchical memory levels based at least in part on the predicted subsequent memory access pattern 134, for example, by predictively pre-fetching target pre-fetch data 138, which is identified from the predicted subsequent memory access pattern 134, from a higher (e.g., memory array) memory level to one or more lower (e.g., cache and/or pre-fetch buffer) memory levels 50.

Figure 9:
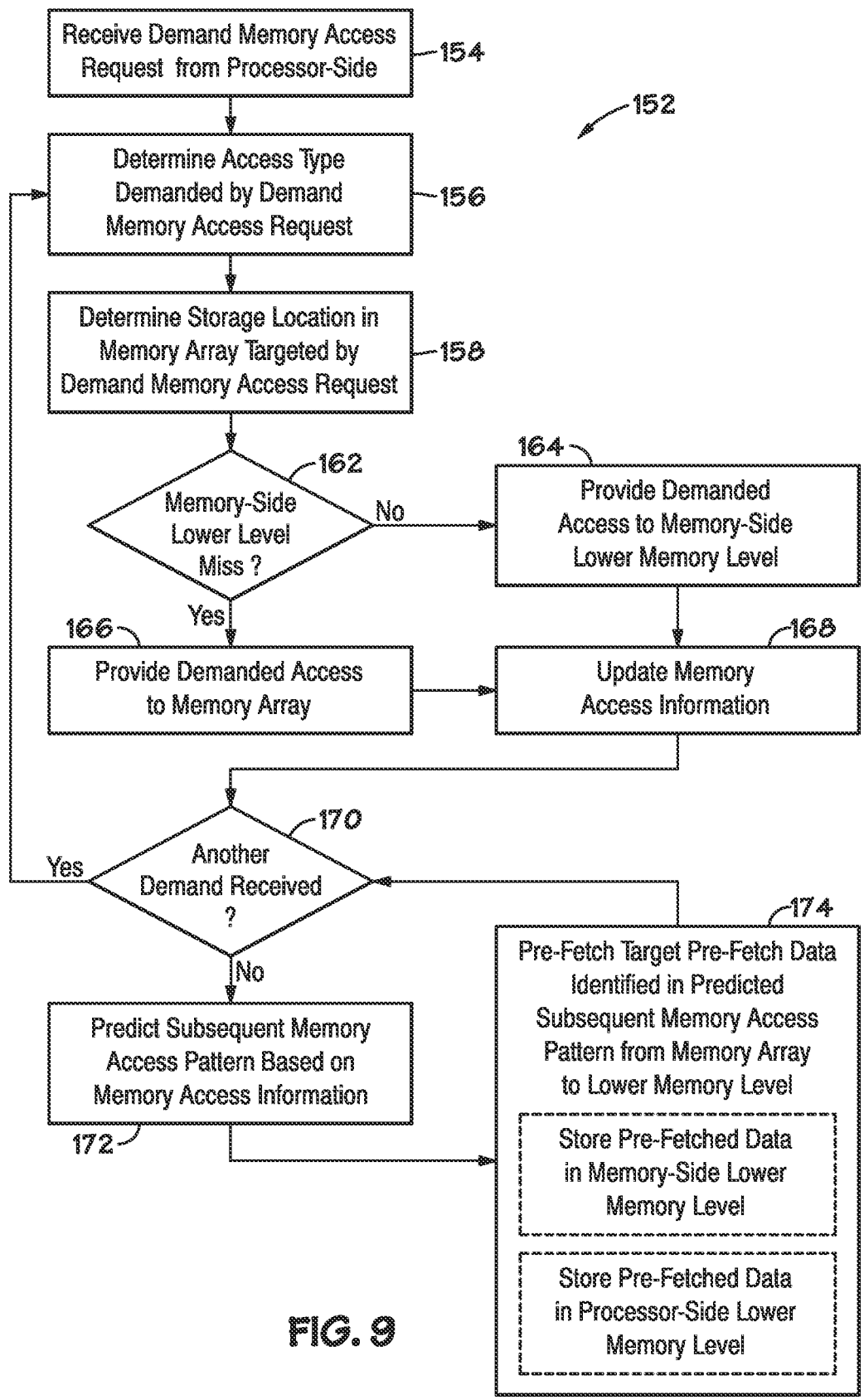
FIG. 9 is a flow diagram of an example process for operating the memory-side memory sub-system of FIG. 5, in accordance with an embodiment of the present disclosure.

To help illustrate, an example of a process 152 for operating a memory-side memory sub-system 14B is described in FIG. 9. Generally, the process 152 includes receiving a demand memory access request from a processor-side (process block 154), determining an access type demanded by the demand memory access request (process block 156), determining a storage location in a memory array targeted by the demand memory access request (process block 158), and determining whether the demand memory access request results in a memory-side lower level miss (decision block 162).

Additionally, the process 152 includes providing the demanded access to a memory-side lower memory level when the demanded storage location does not result in a memory-side lower memory level miss (process block 164) and providing the demanded access to the memory array when the demanded storage location does results in a memory-side lower memory level miss (process block 166). Furthermore, the process 152 includes updating memory access information (process block 168) and determining whether another demand memory access request has been received (decision block 170). When another demand memory access request has not yet been received, the process 152 includes predicting a subsequent data access pattern based on the memory access information (process block 172) and pre-fetching target pre-fetch data identified in the predicted subsequent memory access pattern from the memory array to a lower memory level (process block 174).

Although described in a particular order, which represents a particular embodiment, it should be noted that the process 152 may be performed in any suitable order. Additionally, embodiments of the process 152 may omit process blocks and/or include additional process blocks. Moreover, in some embodiments, the process 152 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a memory-side memory controller 34B implemented in a memory-side memory sub-system 14B of a computing system 10 may receive a demand (e.g., read or write) memory access request output from a processor-side of the computing system 10 (process block 154). As described above, in some embodiments, a processor-side memory sub-system 14A may output a memory access request via a memory bus 20A and a memory-side bus interface 86 may be coupled between the memory bus 20A and one or more memory-side internal communication buses 20C. Thus, at least in such embodiments, the memory-side bus interface 86 may receive a memory access request from the memory bus 20A and route the memory access request to the memory-side memory controller 34B via the one or more memory-side internal communication buses 20C.

Additionally, the memory-side memory controller 34B may determine an access type being demanded by the memory access request (process block 156). As described above, in some embodiments, a memory access request may include one or more request parameters to be used by a memory sub-system 14 to provide memory (e.g., data) access demanded by the memory access request. In particular, as described above, the request parameters included in a memory access request may indicate a type of memory access being demanded. For example, the request parameters may include an access type bit (e.g., indicator), which indicates that read access is being demanded when set (e.g., "1" bit or high) and that write access is being demanded when not set (e.g., "0" bit or low). Accordingly, in such embodiments, the memory-side memory controller 34B may determine whether the demand memory access request is demanding read access or write access based at least in part on the value of one or more request parameters included in the demand memory access request.

Furthermore, the memory-side memory controller 34B may determine a storage location in a memory array 28 of the memory-side memory sub-system 14B targeted by the demand memory access request (process block 158). As described above, in some embodiments, a memory access request may include one or more request parameters that identify a virtual memory address and/or a physical memory address (e.g., row address and column address pairing) of a storage location in a memory sub-system 14 targeted for access by the memory access request. Accordingly, in such embodiments, the memory-side memory controller 34B may determine (e.g., identify) the demanded storage location in the memory array 28 based at least in part on the value of one or more request parameters included in the demand memory access request (process block 156).

The memory-side memory controller 34B may determine whether the demanded storage location results in a memory-side lower (e.g., cache and/or pre-fetch buffer) memory level miss (decision block 162). In some embodiments, the memory-side memory controller 34B may determine whether a memory address results in a memory-side lower memory level 50 based at least in part on its virtual memory address and/or its physical memory address associated with the data block 56. For example, based at least in part on its virtual memory address and physical memory address, the memory-side memory controller 34B may determine a target value of a tag parameter 60 (e.g., metadata 58) expected to be associated with the demanded storage location in the memory array 28.

By searching valid lines 52 included in each memory-side lower (e.g., cache and/or pre-fetch buffer) memory level 50 based on the target tag parameter value, the memory-side memory controller 34B may determine whether the demanded storage location results in a memory-side lower memory level miss. For example, when the target tag parameter value does not match the tag parameter values included in any of the memory-side lower memory levels 50, the memory-side memory controller 34B may determine that the demanded storage location results in a memory-side lower memory level 50 miss. On the other hand, when the target tag parameter value is included in one or more valid lines 52 of the memory-side lower memory levels 50, the memory-side memory controller 34B may determine that the demanded storage location results in a memory-side lower memory level 50 hit and, thus, does not result in a memory-side lower memory level 50 miss.

When the demanded storage location does not result in a memory-side lower memory level 50 miss, the memory-side memory controller 34B may instruct a memory-side lower (e.g., cache and/or pre-fetch buffer) memory level 50 to provide the demanded memory access (process block 164). In particular, when read access is being demanded, the memory-side memory controller 34B may instruct a memory-side lower memory level 50 to output a line 52 with a tag parameter value that matches the target tag parameter value expected to be associated with the demanded storage location and, thus, a data block 56 stored at the demanded storage location. When stored in a higher memory level (e.g., memory channel cache 108), in some embodiments, the demanded data block 56 may pass through one or more memory-side lower memory levels 50 (e.g., shared memory-side caches 94) before being output to the memory bus 20A. Additionally or alternatively, when write access is being demanded, the memory-side memory controller 34B may instruct a memory-side lower memory level 50 to store a target data block 56, which is received from the memory bus 20A along with the demand memory access request, in a line 52 with a tag parameter value that matches the target tag parameter value expected to be associated with the demanded storage location.

On the other hand, when the demanded storage location results in a memory-side lower memory level miss, the memory-side memory controller 34B may instruct the memory array 28 to provide the demanded memory access (process block 166). In particular, when read access is being demanded, the memory-side memory controller 34B may locate the demanded data block 56 in the memory array 28 and instruct the memory array 28 to output the target data block 56 (process block 164). For example, the memory-side memory controller 34B may instruct row select circuitry 92 to activate a memory cell row 104 of the memory array 28 in which the demanded data block 56 is stored. In some embodiments, the row select circuitry 92 may activate the memory cell row 104 identified by a row address associated with the demanded data block 56. Additionally, in some embodiments, the row select circuitry 92 may activate the memory cell row 104 by outputting an activation (e.g., logic high) signal to a word line 98 coupled to the memory cells 96 of the memory cell row 104.

Furthermore, in some embodiments, column select circuitry 94 may read the demanded data block 56 from the activated memory cell row 104 by selecting amplifier circuitry 100 coupled to a memory cell column 106 identified by a column address associated with the demanded data block 56. Additionally or alternatively, the column select circuitry 94 may mux outputs from each memory cell columns 106 based on the column address associated with the demanded data block 56. After output from the memory array 28, in some embodiments, the demanded data block 56 may pass through one or more memory-side lower memory levels 50 (e.g., shared memory-side cache 110) before being output to the memory bus 20A.

On the other hand, when write access is being demanded, the memory-side memory controller 34B may locate the demanded storage location in the memory array 28 and instruct the memory array 28 to store a target data block 56 at the demanded (e.g., targeted) storage location. To store the target data block 56 in the memory array 28, in some embodiments, the memory-side memory controller 34B may instruct row select circuitry 92 to activate a memory cell row 104 of the memory array 28 that includes the demanded storage location at which the target data block 56 is to be stored. In other words, in such embodiments, the row select circuitry 92 may activate the memory cell row 104 identified by a row address of the demanded storage location. Additionally, in some embodiments, the row select circuitry 92 may activate the memory cell row 104 by outputting an activation (e.g., logic high) signal to a word line 98 coupled to the memory cells 96 of the memory cell row 104.

To store the target data block 56 in an activated memory cell row 104, in some embodiments, the memory-side memory controller 34B may instruct column select circuitry 94 to select amplifier circuitry 100 coupled to a memory cell column 106 of the memory array 28 that includes the demanded storage location at which the target data block 56 is to be stored, for example, at least in part by supplying the target data block 56 to the amplifier circuitry 100 to enabling a driver amplifier implemented in the amplifier circuitry 100 to amplify power (e.g., current and/or voltage) of an electrical signal used to indicate the target data block 56. In other words, in some embodiments, the column select circuitry 94 may facilitate writing the target data block 56 to the activated memory cell row 104 by selecting amplifier circuitry 100 coupled to a memory cell column 106 identified by a column address of the demanded storage location. In some embodiments, the memory-side memory controller 34B may additionally instruct the memory sub-system 14 to store an instance of the data block 56 in one or more memory-side lower (e.g., cache and/or pre-fetch buffer) memory levels 50, for example, to facilitate reducing data retrieval latency if the data block 56 is subsequently demanded again.

In any case, to facilitate predicting a subsequent memory access pattern, the memory-side memory controller 34B may update memory access information 112 with memory access information 112 associated with the demand memory access request (process block 168). In some embodiments, the memory-side memory controller 34B may update the memory access information 112 by including (e.g., adding) the memory access information 112 associated with the demand memory access request in a set of input parameters 130 supplied to a machine learning block 114, such as a neural network block 114A. Additionally or alternatively, the memory-side memory controller 34B may update a historical memory access information table 116 based at least in part on the memory access information 112 associated with the demand memory access request.

Figure 10:
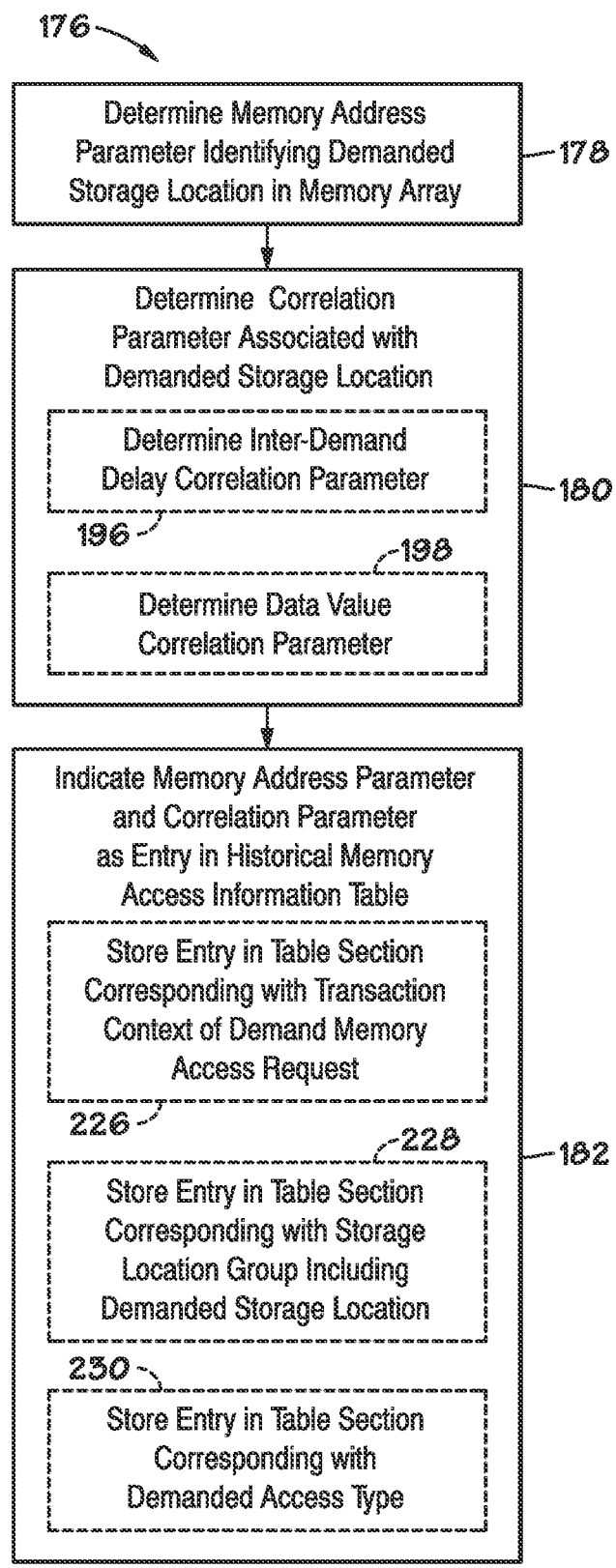
FIG. 10 is a flow diagram of an example process for updating memory access information indicated in the historical memory access information table of FIG. 7, in accordance with an embodiment of the present disclosure.

To help illustrate, an example of a process 176 for updating a historical memory access information table 116, which may be monitored and/or used by a (e.g., memory-side and/or processor-side) memory controller 34, is described in FIG. 10. Generally, the process 176 includes determining a memory address parameter identifying a demanded storage location in a memory array (process block 178), determining a correlation parameter associated with the demanded storage location (process block 180), and indicating the memory address parameter and the correlation parameter as an entry in a historical memory access information table (process block 182).

Although described in a particular order, which represents a particular embodiment, it should be noted that the process 176 may be performed in any suitable order. Additionally, embodiments of the process 176 may omit process blocks and/or include additional process blocks. Moreover, in some embodiments, the process 176 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., memory-side and/or processor-side) memory controller 34 implemented in a memory sub-system 14 may determine a demanded memory address parameter 142, which identifies a storage location in the memory sub-system 14 targeted by a demand (e.g., read or write) memory access request (process block 178). As described above, in some embodiments, a memory access request may include one or more request parameters to be used by a memory sub-system 14 to provide memory (e.g., data) access demanded by the memory access request. For example, the one or more request parameters may indicate a virtual memory address and/or a physical memory address (e.g., row address and column address pairing) of a storage location in a memory sub-system 14 targeted for access by the memory access request. Accordingly, in such embodiments, the memory controller 34 may determine a demand memory address parameter 142 that identifies a demanded storage location in the memory sub-system 14 based at least in part on the value of one or more request parameters included in the demand memory access request.

Additionally, the memory controller 34 may determine one or more correlation parameters 144 associated with the demanded storage location (process block 180). As described above, in some embodiments, correlation parameters 144 associated with a demanded storage location may include an inter-demand delay correlation parameter 148. In other words, in some embodiments, determining the correlation parameters 144 associated with the demanded storage location may include determining one or more inter-demand delay correlation parameters 148 associated with the demanded storage location (process block 182).

Figure 11:
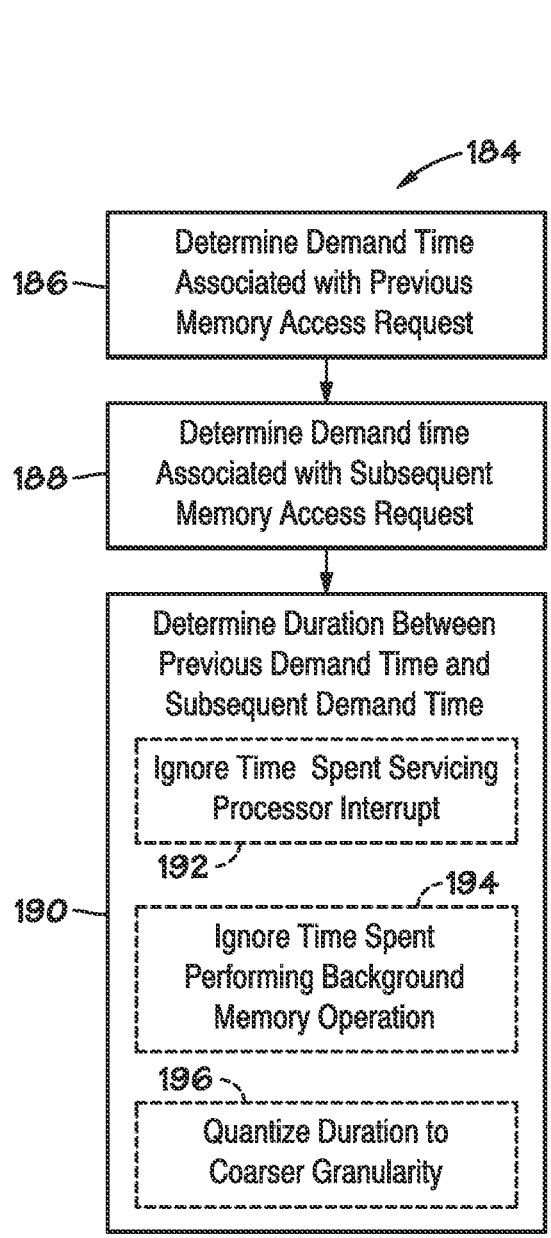
FIG. 11 is a flow diagram of an example process for determining a demand delay correlation parameter, in accordance with an embodiment of the present disclosure.

To help illustrate, an example of a process 184 for determining an inter-demand delay correlation parameter 148 is described in FIG. 11. Generally, the process 184 includes determining a demand time associated with a previous memory access request (process block 186), determining a demand time associated with a subsequent memory access request (process block 188), and determining a duration between the previous demand time and the subsequent demand time (process block 190).

Although described in a particular order, which represents a particular embodiment, it should be noted that the process 184 may be performed in any suitable order. Additionally, embodiments of the process 184 may omit process blocks and/or include additional process blocks. Moreover, in some embodiments, the process 184 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., memory-side and/or processor-side) memory controller 34 implemented in a computing system 10 may determine a demand time associated with a previous memory access request (process block 186). When implemented in a processor-side of the computing system 10, in some embodiments, the memory controller 34 may determine the previous demand time using a transmission time at which the previous memory access request is output (e.g., transmitted) to a memory bus 20A. On the other hand, when implemented in a memory-side of the computing system 10, in some embodiments, the memory controller 34 may determine the previous demand time using a receipt time at which the previous memory access request is output (e.g., received) from a memory bus 20A.

Additionally, the memory controller 34 may determine a demand time associated with a subsequent memory access request, for example, which is to be fulfilled directly after the previous memory access request (process block 188). When implemented in a processor-side of the computing system 10, in some embodiments, the memory controller 34 may determine the subsequent demand time using a transmission time at which the subsequent memory access request is output (e.g., transmitted) to a memory bus 20A. On the other hand, when implemented in a memory-side of the computing system 10, in some embodiments, the memory controller 34 may determine the subsequent demand time using a receipt time at which the subsequent memory access request is output (e.g., received) from a memory bus 20A.

Furthermore, the memory controller 34 may determine a duration between the previous demand time associated with the previous memory access request and the subsequent demand time associated with the subsequent memory access request (process block 190). In some embodiments, the duration may be indicated based on the number of clock cycles that elapsed between the previous demand time and the subsequent demand time. Additionally or alternatively, the duration may be indicated as an absolute time difference between the previous demand time and the subsequent demand time. Furthermore, in some embodiments, the duration between the previous demand time and the subsequent demand time may be directly used as an inter-demand delay correlation parameter 148 associated with the subsequent memory access request and, thus, a storage location targeted by the subsequent memory access request.

As will be described in more detail below, in some embodiments, a subsequent memory access pattern may be predicted based at least in part on correlations between inter-demand delay correlation parameters 148 associated with (e.g., resulting from) different memory access requests. However, at least in some instances, the duration between demand times of the previous demand time and the subsequent demand time may include noise (e.g., jitter and/or interruption), such as time spent servicing one or more processor interrupts, time spent performing one or more memory refreshes, and/or time spent performing one or more other background (e.g., unrelated) operations. In other words, since background operations, such as a processor interrupt, often occur sporadically (e.g., unpredictably), at least in some instances, predicting a subsequent memory access pattern using inter-demand delay correlation parameters 148 set directly using time differences between successive memory access requests may limit efficacy of data pre-fetching techniques, for example, due to inclusion of the time spent servicing the processor interrupt resulting in improper matches being identified and/or matches inadvertently not being identified.

Thus, to facilitate improving data pre-fetching efficacy (e.g., accuracy and/or coverage), in some embodiments, the memory controller 34 may process the duration between the previous demand time and the subsequent demand time to remove (e.g., filter out) noise, such as time performing (e.g., servicing) background operations, before a resulting value is used as an inter-demand delay correlation parameter 148 associated with the subsequent memory access request. In other words, in such embodiments, the memory controller 34 may pre-process the duration to determine a noise-filtered inter-demand delay, which may then be used as the inter-demand delay correlation parameter 148 associated with the subsequent memory access request.

As described above, in some embodiments, background (e.g., unrelated) operations may include processor interrupts and/or background memory operations, such as volatile memory refreshes. Thus, in some embodiments, determining a noise-filtered inter-demand delay may include processing the duration between the previous demand time and the subsequent demand time to ignore time spent servicing one or more processor interrupts (process block 192). Additionally or alternatively, determining a noise-filtered inter-demand delay may include processing the duration between the previous demand time and the subsequent demand time to ignore time spent performing background memory operations, such as volatile memory refreshes (process block 194). In some embodiments, the memory controller 34 may process the duration between the previous demand time and the subsequent demand time to ignore time spent performing a background operation, such as a processor interrupt and/or a memory refresh, by delaying the previous demand time, advancing the subsequent demand time, or both to offset the time spent performing the background operation.

Additionally or alternatively, determining a noise-filtered inter-demand delay may include processing the duration between the previous demand time and the subsequent demand time to quantize the duration to a coarser granularity (process block 196). For example, the memory controller 34 may determine the noise-filtered inter-demand delay at least in part by quantizing the duration between the previous demand time and the subsequent demand time to a nearest four clock cycle granularity. Additionally or alternatively, based on the coarser granularity, the memory controller 34 may reorder a sequence of memory access requests to artificially ignore memory access requests resulting from background operations, such as a processor interrupt. For example, the memory controller 34 may reorder the sequence such that a background operation (e.g., processor interrupt) memory access request, which actually occurred between the previous memory access request and the subsequent memory access request, swaps places with the previous memory access request or the subsequent memory access request, thereby artificially making the subsequent memory access request directly follow the previous memory access request. As such, using the reordered sequence, the memory controller 34 may determine a noise-filtered inter-demand delay between the previous memory access request and the subsequent memory access, which may be used as an inter-demand delay correlation parameter 148 associated with the subsequent memory access request and/or a storage location targeted by the subsequent memory access request. In this manner, a memory sub-system 14 may operate to determine one or more inter-demand delay correlation parameters 148 to be included in memory access information 112, for example, to be indicated in a historical memory access information table 116 and/or to be input to a machine learning block 114, such as a neural network block 114A.

Returning to the process 176 of FIG. 10, as described above, in some embodiments, correlation parameters 144 associated with a demanded storage location may additionally or alternatively include one or more transaction context parameters 150 indicative of a transaction context associated with a memory access request targeting the demanded storage location. In other words, in such embodiments, determining correlation parameters 144 associated with the demanded storage location may additionally or alternatively include determining one or more transaction context parameters 150 indicative of the transaction context associated with the memory access request targeting the demanded storage location. Furthermore, as described above, in some embodiments, correlation parameters 144 associated with a demanded storage location may additionally or alternatively include one or more data value correlation parameters 146 associated with a data block 56 targeted for storage (e.g., writing) to the demanded storage location and/or for retrieval (e.g., reading) from the demanded storage location. In other words, in such embodiments, determining correlation parameters 144 associated with the demanded storage location may additionally or alternatively include determining one or more data value correlation parameters 146 associated with a target data block 56 to be written to and/or read from the demanded storage location (process block 198).

Figure 12:
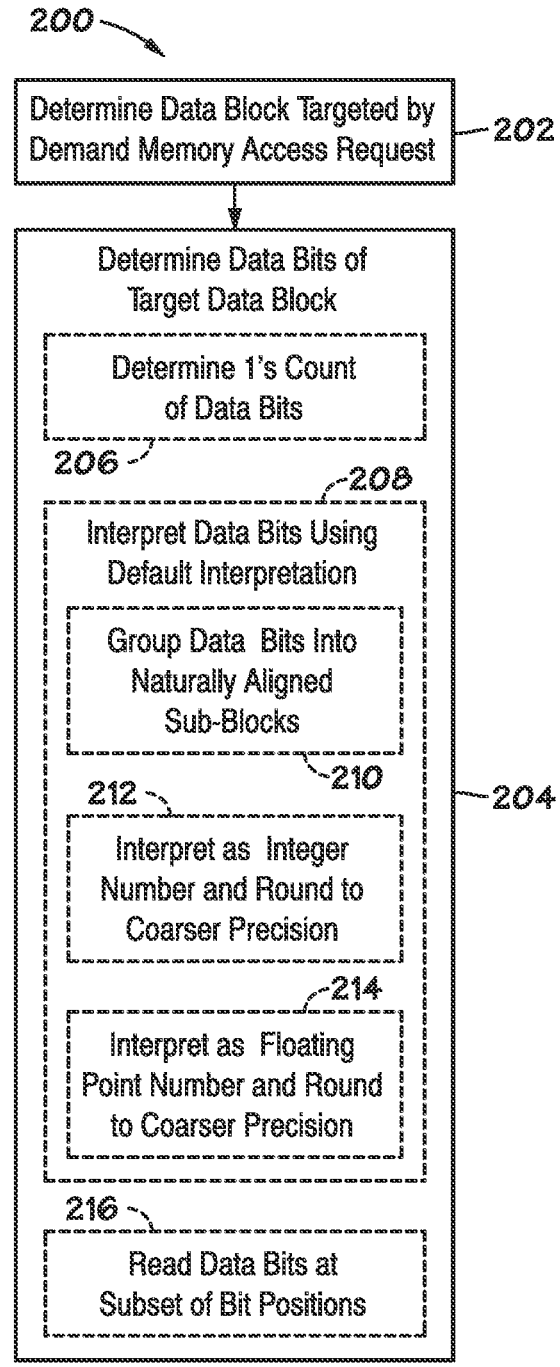
FIG. 12 is a flow diagram of an example process for determining a data value correlation parameter, in accordance with an embodiment of the present disclosure.

To help illustrate, an example of a process 200 for determining a data value correlation parameter 146 is described in FIG. 12. Generally, the process 200 includes determining a data block targeted by a memory access request (process block 202) and interpreting data bits of the target data block (process block 204). Although described in a particular order, which represents a particular embodiment, it should be noted that the process 200 may be performed in any suitable order. Additionally, embodiments of the process 200 may omit process blocks and/or include additional process blocks. Moreover, in some embodiments, the process 200 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., memory-side and/or processor-side) memory controller 34 implemented in a memory sub-system 14 of a computing system 10 may determine (e.g., identify) a data block 56 targeted by a demand memory access request (process block 202). As described above, via a write memory access request, a processor-side of computing system 10 may demand storage of a data block 56, which is received along with and/or included in the write memory access request, at a demanded storage location in the memory sub-system 14. As such, when the memory access request is a write memory access request, the memory controller 34 may identify a data block 56 received with and/or included in the write memory access request as a target data block 56.

Additionally, as described above, via a read memory access request, a processor-side of a computing system 10 demand (e.g., target) retrieval of a data block 56 from a demanded storage location in a memory sub-system 14. Furthermore, as described above, a memory access request may include one or more request parameters that identify a storage location in a memory sub-system 14 to which the memory access request is demanding access. As such, when the demand memory access request is a read memory access request, the memory controller 34 may identify a demanded storage location based at least in part on one or more of its read access parameters and identify a data block 56 stored at the demanded storage location as a target data block 56.

To facilitate determining one or more data value correlation parameters 146 to be associated with the target data block 56, the memory controller 34 may determine the data bits that are used to indicate a raw data value in the target data block 56, for example, to the exclusion of bits used to indicate metadata 58 (process block 204). In some embodiments, the memory controller 34 may directly use each of the data bits as a data value correlation parameter 146 associated with the target data block 56. In other words, in such embodiments, the memory controller 34 may directly use the raw data value indicated in the target data block 56 as the data value correlation parameter 146 associated with the target data block 56.

As will be described in more detail below, in some embodiments, a subsequent memory access pattern may be predicted based at least in part on correlations between data value correlation parameters 146 associated with (e.g., resulting from) different memory access requests. However, at least in some instances, efficacy of predictive data pre-fetch techniques may vary with bit depth of correlation parameters 144, for example, due to larger (e.g., longer) bit depths increasing likelihood of overfitting a neural network 131 and/or increasing the number of unique values to be historically tracked. Merely as an illustrative non-limiting example, predictive data pre-fetch techniques may historically track 2^32 unique values when thirty-two bit correlation parameters 144 are used, whereas the data pre-fetch techniques may historically track 2^4 unique values when four bit correlation parameters 114 are used. As such, at least in some instances, predicting a subsequent memory access pattern using data value correlation parameters 146 set directly using raw data value may limit efficacy of data pre-fetching techniques, for example, due to a larger number of unique value resulting in matches inadvertently not being identified and/or increasing duration (e.g., latency) before a match is identified.

Thus, to facilitate improving data pre-fetching efficacy (e.g., accuracy and/or coverage), in some embodiments, the memory controller 34 may process one or more data bits of the target data block 56 to extract a representative data value, which, at least in some instances, may change at a slower rate compared to the raw data values. In other words, in such embodiments, the memory controller 34 may pre-process the one or more data bits to determine a value representative of the raw data value indicated in the target data block 56, which may then be used as a data value correlation parameter 146 associated with the demand memory access request. For example, in some embodiments, the memory controller 34 may determine a representative data value associated with the target data block 56 by determining the number of logic high data bits (e.g., "1-bits") used to indicate the raw data value in the target data block 56. In other words, in such embodiments, the memory controller 34 may determine the representative data value and, thus, a data value correlation parameter 146 to be associated with the target data block 56 as a 1's count of the data bits in the target data block 56 (process block 206).

Additionally or alternatively, the memory controller 34 may determine the representative data value and, thus, a data value correlation parameter 146 to be associated with the target data block 56 by interpreting the data bits of the target data block 56. However, at least in some instances, different interpretations of the same data bits may result in different data values being determined. For example, interpreting the data bits as an integer value may result in a different data value compared to interpreting the data bits as a floating point value. Moreover, at least in some instances, the same raw data value may be indicated using different data bits, for example, depending on whether the data bits are intended to be interpreted as an integer value or as a floating point value. In fact, since data blocks 56 are processed (e.g., interpreted) in processing circuitry 16 of a processing sub-system 12, at least in some instances, a memory sub-system 14 and, thus, its memory controller 34 may be unaware of an intended (e.g., proper) interpretation of the data bits included in a data block 56.

As such, in some embodiments, the memory controller 34 may determine one or more representative data values associated with the target data block 56 by interpreting the data bits of the target data block 56 using one or more default interpretations, for example, irrespective of an intended interpretation of the data bits (process block 208). In some embodiments, the data bits of a data block 56 may be used to indicate multiple raw data values, for example, when the data block 56 is used to indicate an array or a matrix. As such, in some embodiments, interpreting the data bits of the target data block 56 using a default interpretation may include grouping the data bits into one or more naturally aligned sub-blocks (process block 210). For example, the memory controller 34 may group the data bits of the target data block 56 into one or more eight-bit sub-blocks, one or more sixteen-bit sub-blocks, one or more thirty-two-bit sub-blocks, one or more sixty-four-bit sub-blocks, one or more one hundred twenty-eight bit sub-blocks, one or more two hundred fifty-six-bit sub-blocks, or any combination thereof.

In some embodiments, the memory controller 34 may group the data bits of the target data block 56 such that sub-blocks of the same size (e.g., type) are non-overlapping. For example, the memory controller 34 may group the data bits such that a first eight-bit sub-block includes the data bits indicated at bit position zero through bit position seven of the target data block 56, a second eight-bit sub-block includes the data bits indicated at bit position eight through bit position fifteen of the target data block 56, and so on.

Additionally or alternatively, the memory controller 34 may group the data bits of the target data block 56 such that different sub-blocks partially overlap. To help illustrate, continuing with the above-example, the memory controller 34 may group the data bits such that a sixteen-bit sub-block includes the data bits indicated at bit position zero through bit position fifteen of the target data block 56 and, thus, partially overlaps with the first eight-bit sub-block as well as partially overlapping with the second eight-bit sub-block. In fact, in some embodiments, the memory controller 34 may group the data bits of the target data block 56 such that one or more sub-blocks of the same size partially overlap. For example, the memory controller 34 may group the data bits such that a first eight-bit sub-block includes the data bits indicated at bit position zero through bit position seven of the target data block 56 while a second eight-bit sub-block includes the data bits indicated at bit position one through bit position eight of the target data block 56.

Furthermore, in some embodiments, interpreting the data bits of the target data block 56 using a default interpretation may include interpreting the target data block 56 as a whole and/or one or more sub-blocks identified in the target data block 56 as an integer value and rounding to a coarser precision (e.g., shorter bit-depth), for example, irrespective of whether actually intended to be interpreted as an integer value (process block 212). In other words, to facilitate determining a representative data value associated with the target data block 56, in some such embodiments, the memory controller 34 may interpret the data bits of the target data block 56 as one or more integer values even when actually intended to be interpreted as one or more floating point values. Additionally or alternatively, in some such embodiments, the memory controller 34 may interpret the data bits of the target data block 56 as multiple integer values even when actually intended to be interpreted as a single (e.g., integer or floating point) value.

Moreover, in some embodiments, interpreting the data bits of the target data block 56 using a default interpretation may include interpreting the target data block 56 as a whole and/or one or more sub-blocks identified in the target data block 56 as a floating point value and rounding to a coarser precision (e.g., shorter bit-depth), for example, irrespective of whether actually intended to be interpreted as a floating number (process block 214). In other words, to facilitate determining a representative data value associated with the target data block 56, in some such embodiments, the memory controller 34 may interpret the data bits of the target data block 56 as one or more floating point values even when actually intended to be interpreted as one or more integer values. Additionally or alternatively, in some such embodiments, the memory controller 34 may interpret the data bits of the target data block 56 as multiple floating point values even when actually intended to be interpreted as a single (e.g., integer or floating point) value. In this manner, the memory controller 34 may interpret the data bits of the target data block 56 using one or more default interpretations to determine one or more representative data value and, thus, one or more data value correlation parameters 146 to be associated with the target data block 56.

To determine a data value correlation parameter 146 to be associated with the target data block 56, in some embodiments, the memory controller 34 may additionally or alternatively read data bits indicated at a specific subset of bit positions in the target data block 56 (process block 216). In other words, in such embodiments, the memory controller 34 may determine a representative data value and, thus, a data value correlation parameters 146 to be associated with the target data block 56 by reading the value of a data bit indicated at each representative data value bit positions included in the specific subset of bit positions. In some embodiments, the representative data value bit positions included in the specific subset of bit positions may be predetermined. For example, the memory controller 34 may determine the representative data value and, thus, the data value correlation parameters 146 to be associated with the target data block 56 as the data bits indicated in N upper bit positions (e.g., N most-significant-bits) of the target data block 56. In other embodiments, the representative data value bit positions included in the specific subset of bit positions may be adaptively (e.g., dynamically) selected, for example, to facilitate further improving efficacy (e.g., coverage and/or accuracy) of predictive data pre-fetching techniques.

Figure 13:
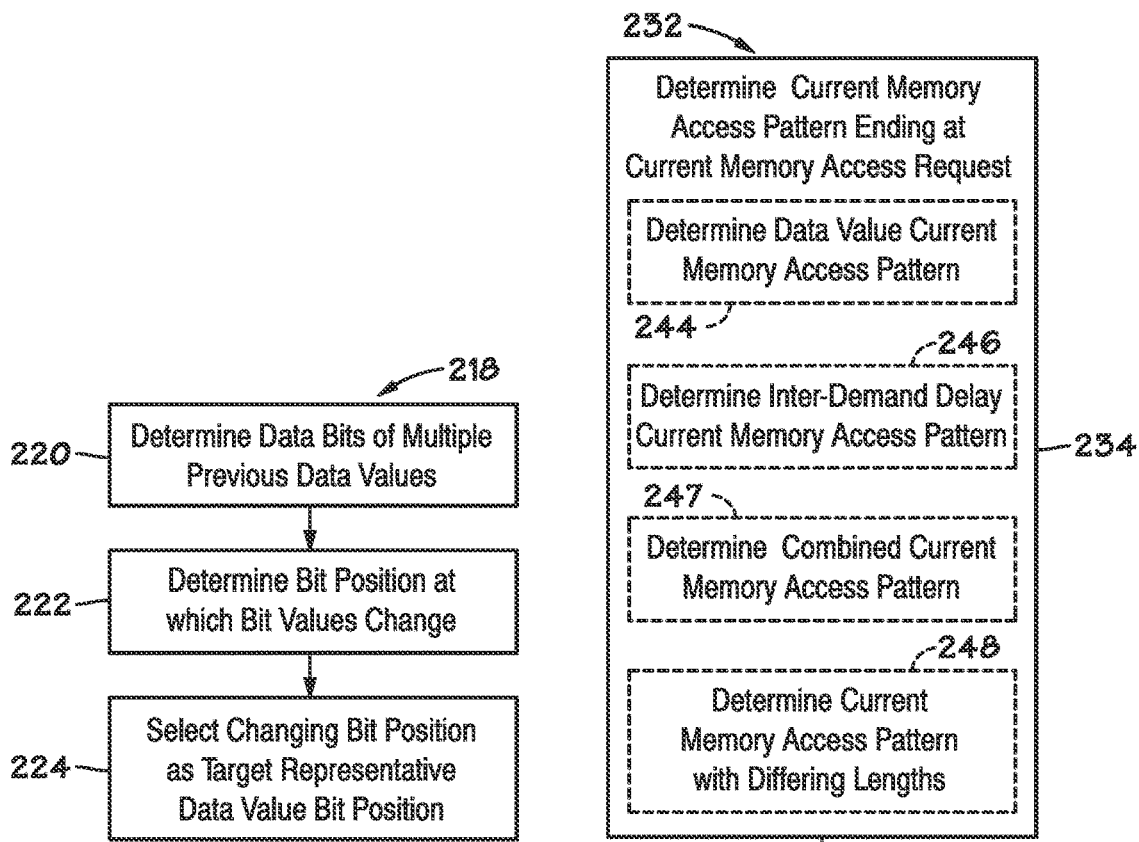
FIG. 13 is a flow diagram of an example process for determining target bit positions to be used to determine data correlation parameters, in accordance with an embodiment of the present disclosure.

To help illustrate, an example of a process 218 for adaptively determining (e.g., selecting) target representative data value bit positions is described in FIG. 13. Generally, the process 218 includes determining data bits of multiple previous data values (process block 220), determining a bit position at which bit values change (process block 222), and selecting the changing bit position as a target representative data value bit position (process block 224). Although described in a particular order, which represents a particular embodiment, it should be noted that the process 218 may be performed in any suitable order. Additionally, embodiments of the process 218 may omit process blocks and/or include additional process blocks. Moreover, in some embodiments, the process 218 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., memory-side and/or processor-side) memory controller 34 implemented in a memory sub-system 14 may determine the data bits used to indicate raw data values in data blocks 56 targeted by multiple previously fulfilled memory access requests (process block 220). As described above, in some embodiments, a data block 56 targeted by a demand memory access request for storage at and/or retrieval from a demanded storage location in a memory sub-system 14 may be identified by a demanded memory address parameter 142 included in associated memory access information 112, for example, indicated in an associated table entry 118 of a historical memory access information table 116A. Thus, in some such embodiments, the memory controller 34 may determine the data bits used to indicate a raw data value in a previously targeted data block 56 at least in part by reading the data bits from a demanded storage location identified by a demanded memory address parameter 142 included in memory access information 112 associated with the memory access request that targeted the data block 56.

Additionally, the memory controller 34 may determine one or more bit positions at which bit values change over the course of the multiple previously targeted data blocks 56 (process block 222). In some embodiments, the memory controller 34 may determine whether bit values at a bit position change over the course of the multiple previously targeted data blocks 56 by performing an exclusive-or (XOR) on the bit values indicated at the bit position. For example, the memory controller 34 may exclusive-or the bit values indicated at a first bit position in each of the previously targeted data block 56 to determine whether the bit values at the first bit position change, exclusive-or the bit values indicated at a second bit position in each of the previously targeted data block 56 to determine whether the bit values at the second bit position change, and so on. In such embodiments, the memory controller 34 may determine that the bit values indicated at a specific bit position change over the course of the previously targeted data blocks 56 when a result of the exclusive-or is a logic high (e.g., "1-bit") and that the bit values indicated at the specific bit position do not change over the course of the previously targeted data blocks 56 when the result of the exclusive-or is a logic low (e.g., "0-bit").

The memory controller 34 may then select one or more of the bit positions at which bit values change over the course of the previously targeted data blocks 56 for inclusion in a specific subset of bit positions, which are read to determine a representative data value and, thus, a data value correlation parameters 146 to be associated with a subsequently targeted data block 56 (process block 224). In some embodiments, each of the bit positions at which bit values change over the course of the previously targeted data blocks 56 may be selected as a target representative data value bit position included in the specific subset of bit positions. Additionally, to facilitate determining a data value correlation parameter 146 to be associated with a subsequently targeted data block 56, in some embodiments, the memory controller 34 may store an indication of the target representative data value bit positions in the memory sub-system 14, for example, via a register in the memory controller 34. In this manner, a (e.g., memory-side and/or processor-side) memory controller 34 may adaptively select one or more target representative data value bit position, which are to be read to determine a data value correlation parameter 146 associated with a subsequently targeted data block 56, for example, in addition to one or more other correlation parameters 144, such as an inter-demand delay correlation parameter 148, associated with the subsequently targeted data block 56.

As described above, in some embodiments, one or more correlation parameters 144 may be associated with a demanded storage location in a memory sub-system 14 by including the one or more correlation parameters 144 and a memory address parameter 142, which identifies the demanded storage location, in a set of input parameters 130 supplied to a machine learning block 114, such as a neural network block 114A. Additionally or alternatively, as described above, one or more correlation parameters 144 may be associated with a demanded storage location via a historical memory access information table 116. For example, returning to the process 176 of FIG. 10, to associate one or more correlation parameters 144 with a demanded storage location, the memory controller 34 may indicate the one or more correlation parameters 144 and a demanded memory address parameter 142, which identifies the demanded storage location, as a table entry 118 in the historical memory access information table 116 (process block 182).

As described above, to facilitate further improving data pre-fetching efficacy, in some embodiments, a historical memory access information table 116 may be organized into multiple table sections. For example, in some embodiments, the historical memory access information table 116 may be organized such that different table sections correspond with different transaction context. Thus, in such embodiments, the memory controller 34 may update the historical memory access information table 116 with memory access information 112 associated with a demand memory access request at least in part by storing a table entry 118 indicating the memory access information 112 in a table section corresponding with (e.g., dedicated to) the transaction context of the demand memory access request (process block 226). For example, the memory controller 34 may indicate the table entry 118 in a first table section when the demand memory access request has a first transaction context, a second table section when the demanded memory access request has a second transaction context, and so on.

Furthermore, as described above, in some embodiments, a historical memory access information table 116 may additionally or alternatively be organized such that different table sections correspond with different groups of storage locations (e.g., memory address ranges). Thus, in such embodiments, the memory controller 34 may update the historical memory access information table 116 with memory access information 112 associated with a demand memory access request at least in part by storing a table entry 118 indicating the memory access information 112 in a table section corresponding with (e.g., dedicated to) a group of storage locations including the demanded storage location (process block 228). For example, the memory controller 34 may indicate the table entry 118 in a first table section when the demanded storage location is included in a first group of storage locations (e.g., first memory address range), a second table section when the demanded storage location is included in a second group of storage locations (e.g., second memory address range), and so on.

Moreover, as described above, in some embodiments, a historical memory access information table 116 may additionally or alternatively be organized such that different table sections correspond with different types of memory access. Thus, in such embodiments, the memory controller 34 may update the historical memory access information table 116 with memory access information 112 associated with a demand memory access request at least in part by storing a table entry 118 indicating the memory access information 112 in a table section corresponding with (e.g., dedicated to) the type of memory access demanded by the demand memory access request (process block 230). For example, the memory controller 34 may indicate the table entry 118 in a read access table section when read access is demanded and in a write access table section when write access is demanded.

Although described above with regard to dividing a historical memory access information table 116 into multiple table sections, in some embodiments, historical memory access information 112 may instead be indicated using multiple historical memory access information tables 116. For example, a first historical memory access information table 116 may be dedicated to indicating table entries 118 (e.g., memory access information 112) associated with memory access requests having a first transaction context, a second historical memory access information table 116 may be dedicated to indicating table entries 118 associated with memory access requests having a second transaction context, and so on. Additionally or alternatively, a read access historical memory access information table 116 may be dedicated to indicated table entries 118 associated with read memory access requests and a write access historical memory access information table 116 may be dedicated to indicated table entries 118 associated with write memory access requests. As a further example, a first historical memory access information table 116 may be dedicated to indicating table entries 118 associated with memory access requests targeting storage locations included in a first group of storage locations (e.g., first memory address range), a second historical memory access information table 116 may be dedicated to indicating table entries 118 associated with memory access requests targeting storage locations included in a second (e.g., different) group of storage locations (e.g., second memory address range), and so on.

In any case, to facilitate historically tracking memory access information 112, in some embodiments, table entries 118 may be indicated in a historical memory access information table 116 in accordance with a chronological fulfillment order of corresponding memory access requests, for example, by appending a table entry 118 associated with a later fulfilled memory access request to a table entry 118 associated with an earlier fulfilled memory access request. In some embodiments, the memory controller 34 may indicate a table entry 118 chronologically relative to a historical memory access information table 116 as a whole. Additionally or alternatively, the memory controller 34 may indicate a table entry 118 chronologically relative to one or more other table entries 118 in a corresponding table section of a historical memory access information table 116. In this manner, a (e.g., memory-side and/or processor-side) memory sub-system 14 may operate to update a historical memory access information table 116 based on memory access information 112 associated with a (e.g., demand) memory access request.

Returning to the process 152 of FIG. 9, after fulfilling the demand memory access request, the memory-side memory controller 34B may determine whether another memory access request has been received from the processor-side of the computing system (decision block 170). When another demand memory access request has been received, the memory-side memory sub-system 14B may proceed with fulfillment of the other demand memory access request. In other words, in such instances, the memory-side memory controller 34B may determine a storage location targeted by the other demand memory access request (process block 156), determine whether the demand memory access request is demanding read access (decision block 158), and so on. On the other hand, when another demand memory access request has not yet been received, the memory-side memory controller 34B may predict a subsequent memory access pattern that will occur during an upcoming control horizon based at least in part on the updated memory access information 112 (process block 172).

Figure 14:
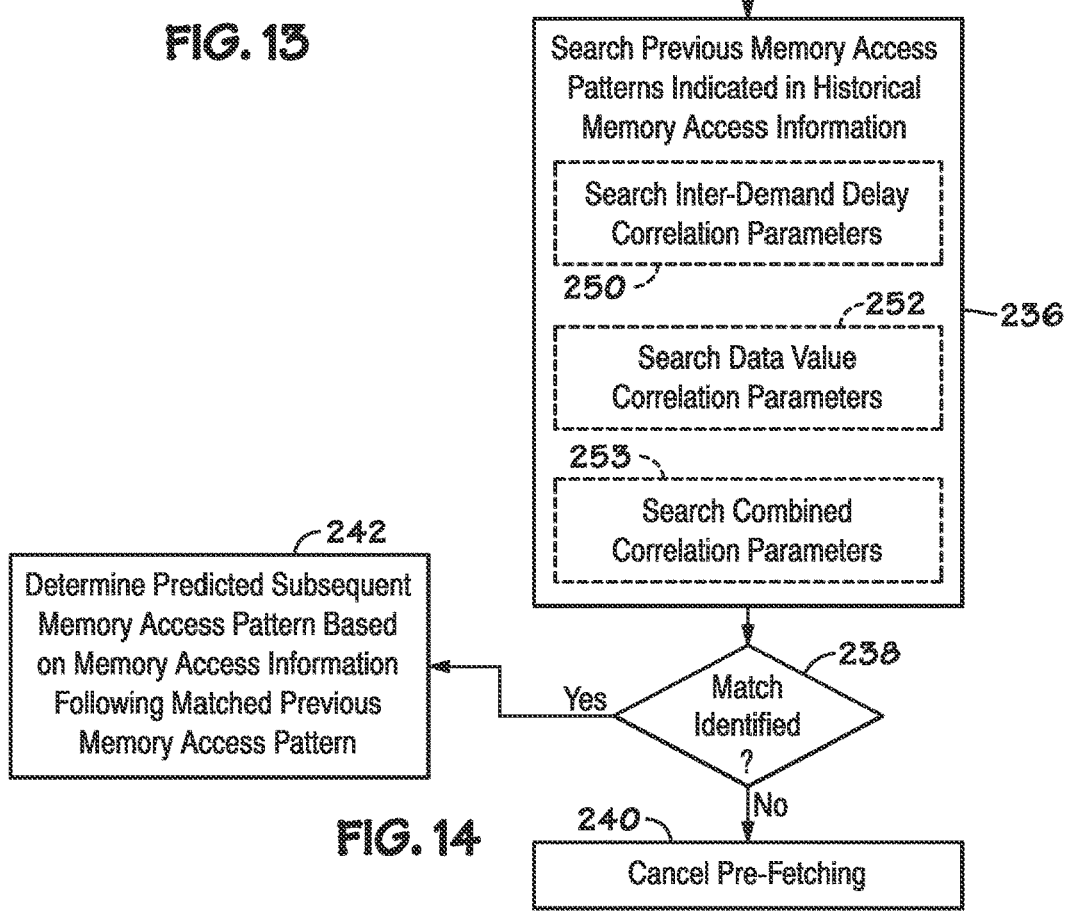
FIG. 14 is a flow diagram of a process for predicting a subsequent memory access pattern based on the historical memory access information table of FIG. 7, in accordance with an embodiment of the present disclosure.

To help illustrate, an example of a process 232 for predicting a subsequent (e.g., future) memory access pattern is described in FIG. 14. Generally, the process 232 includes determining a current memory access pattern end at a current memory access request (process block 234), searching previous memory access patterns indicated in historical memory access information (process block 236), and determining whether a match is identified (decision block 238). Additionally, the process 232 includes canceling pre-fetching when a match is not identified (process block 240) and determining a predicted subsequent memory access pattern based on memory access information following a matched previous memory access pattern when a match is identified.

Although described in a particular order, which represents a particular embodiment, it should be noted that the process 232 may be performed in any suitable order. Additionally, embodiments of the process 232 may omit process blocks and/or include additional process blocks. Moreover, in some embodiments, the process 232 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., memory-side and/or processor-side) memory controller 34 of a memory sub-system 14 may determine a current memory access pattern ending at a storage location targeted by a memory access request currently being fulfilled by the memory sub-system 14 (process block 234). The memory controller 34 may determine a current memory access pattern based at least in on memory access information 112 associated with the current memory access request and, at least when the target sequence length of the current memory access is greater than one (e.g., greater than or equal to two), memory access information 112 associated with one or more memory access requests fulfilled before (e.g., directly preceding) the current memory access request. In particular, in some embodiments, the memory controller 34 may determine the current memory access pattern based on the value of one or more correlation parameters 144 indicated in the memory access information 112, for example, in accordance with a chronological fulfillment order of associated memory access requests.

In fact, in some embodiments, the memory controller 34 may determine multiple different types of current memory access patterns. For example, the memory controller 34 may determine a data value current memory access pattern based on the value of one or more data value correlation parameters 146 indicated in the memory access information 112 (process block 244). Additionally or alternatively, the memory controller 34 may determine an inter-demand delay current memory access pattern based on the value of one or more inter-demand delay correlation parameters 148 indicated in the memory access information 112 (process block 246).

Furthermore, in some embodiments, the memory controller 34 may combine multiple different types of correlation parameters 144 associated with a memory access request into a combined (e.g., signature) correlation parameter associated with the memory access request, for example, by indicating the value of the different types of correlation parameters 144 as an array. As an illustrative example, a combined correlation parameter 146 associated with a memory access request may include one or more inter-demand address stride correlation parameters 151, one or more transaction context parameters 150, one or more inter-demand delay correlation parameters 148, one or more data value correlation parameters 146, or any combination thereof. Thus, in such embodiments, the memory controller 34 may additionally or alternatively determine a combined current memory access pattern based on one or more combined correlation parameters 146 indicated in the memory access information (process block 247).

Moreover, in some embodiments, the memory controller 34 may determine current memory access patterns with differing sequence lengths (process block 248). For example, the memory controller 34 may determine a first current memory access pattern with a sequence length of one based on memory access information 112 associated with a current memory access request. Additionally, the memory controller 34 may determine a second current memory access pattern with a sequence length of two based on memory access information 112 associated with the current memory access request and memory access information 112 associated with a first previous memory access request directly preceding the current memory access request. Furthermore, the memory controller 34 determine may determine a third current memory access pattern with a sequence length of three based on memory access information 112 associated with the current memory access request, memory access information 112 associated with the first previous memory access request directly preceding the current memory access request, and memory access information 112 associated with a second previous memory access request directly preceding the first previous memory access request.

Based on the one or more current memory access patterns, the memory controller 34 may search previous memory access patterns indicated in historical memory access information 112 (process block 236) to determine whether the historical memory access information 112 is indicative of a previous memory access pattern that matches a current memory access pattern (decision block 238). For example, the memory controller 34 may search inter-demand delay correlation parameters 148 indicated in the historical memory access information 112 in an attempt to identify a previous memory access pattern that matches an inter-demand delay current memory access pattern (process block 250). Additionally or alternatively, the memory controller 34 may search data value correlation parameters 146 indicated in the historical memory access information 112 in an attempt to identify a previous memory access pattern that matches a data value current memory access pattern (process block 252). In some embodiments, the memory controller 34 may additionally or alternatively search combined (e.g., signature) correlation parameters 144 (e.g., array including inter-demand address stride correlation parameter 151, transaction context parameter 150, inter-demand delay correlation parameter 148, and data value correlation parameter 146) indicated in the historical memory access information 112 in an attempt to identify a previous memory access pattern that matches a combined (e.g., signature) current memory access pattern (process block 253).

When multiple different types of current memory access patterns are determined, in some embodiments, the memory controller 34 may vary priority of different types of matches, for example, by serially (e.g., successively) searching the different types. As an illustrative example, the memory controller 34 may prioritize combined (e.g., signature) memory access pattern matches compared to data value memory access pattern matches and/or inter-demand delay memory access pattern matches, for example, due to the larger number of criteria for identifying a combined memory access pattern match generally resulting in improved accuracy of a subsequent memory access pattern predicted therefrom. As such, the memory controller 34 may search for a combined memory access pattern match and proceed to searching for an inter-demand delay memory access pattern match and/or a data value memory access pattern match.

Moreover, compared to memory access pattern matches with shorter sequence lengths, matching memory access patterns with longer sequence lengths generally facilitates improving accuracy of a subsequent memory access pattern predicted therefrom, for example, due to the larger number of criteria for identifying a longer memory access pattern match. However, likelihood of matching memory access patterns with longer sequence lengths is generally lower than the likelihood of matching memory access patterns with shorter sequence lengths. As such, to facilitate improving coverage in addition to accuracy, in some embodiments, the memory controller 34 may generally attempt to match a longest sequence length current memory access pattern before successively progressing to shorter sequence length current memory access patterns if a match is not identified.

To help illustrate, continuing with the above example, the memory controller 34 may check whether the third current memory access pattern, which has a sequence length of three, matches a three sequence length previous memory access pattern indicated in historical memory access information 112. When a match with the third current memory access pattern is not identified, the memory controller 34 may check whether the second current memory access pattern, which with a sequence length of two, matches a two sequence length previous memory access pattern indicated in the historical memory access information 112. Additionally, when a match with the second current memory access pattern is not identified, the memory controller 34 may check whether the first current memory access pattern, which has a sequence length of one, matches a one sequence length previous memory access pattern indicated in the memory access information 112.

When a previous memory access pattern matching a current memory access pattern is not identified, in some embodiments, the memory controller 34 may cancel predictive data pre-fetching, for example, to facilitate improving computing system operation efficiency by reducing likelihood of an improperly predicted subsequent memory access request resulting in lower (e.g., cache and/or pre-fetch buffer) memory level pollution (process block 240). On the other hand, when a previous memory access pattern matching a current memory access pattern is identified, the memory controller 34 may determine a predicted subsequent memory access pattern 134 based on historical memory access information 112 associated with one or more memory access requests fulfilled directly after the matched previous memory access pattern (process block 242). For example, the memory controller 34 may determine a (e.g., first) stride length (e.g., address distance) between a storage location targeted at the end of the matched previous memory access request and a storage location targeted by a (e.g., first) previous memory access request directly following the matched previous memory access pattern (e.g., based at least in part on corresponding memory address parameters 142). Additionally, the memory controller 34 may determine the predicted subsequent memory access pattern 134 at least in part by predicting that a storage location that will be targeted by a (e.g., first) subsequent memory access request directly following the current memory access request will be the (e.g., first) stride length away from (e.g., after) a currently targeted storage location.

In an analogous manner, the memory controller 34 may determine the predicted subsequent memory access pattern 134 with a sequence length greater than one (e.g., greater than or equal to two) by continuing to progress (e.g., walk) forward in time. To help illustrate, continuing with the above example, the memory controller 34 may determine a second stride length (e.g., address distance) between the storage location targeted by the first previous memory access request, which directly followed the matched previous memory access pattern, and a storage location targeted by a second previous memory access request directly following the first previous memory access request. Additionally, the memory controller 34 may determine the predicted subsequent memory access pattern 134 at least in part by predicting that a storage location that will be targeted by a second subsequent memory access request directly following the first subsequent memory access request will be the second stride length away from the storage location targeted by the first subsequent memory access request.

In fact, in some embodiments, the memory controller 34 may adaptively (e.g., dynamically) determine a target sequence length of a predicted subsequent memory access pattern 134. For example, when the accuracy confidence of its prediction is higher, the memory controller 34 may increase the target sequence length of the predicted subsequent memory access pattern 134, thereby generally increasing the amount of data predictively pre-fetched to one or more lower memory levels 50. On the other hand, when the accuracy confidence of its prediction is lower, the memory controller 34 may decrease the target sequence length of the predicted subsequent memory access pattern 134, thereby generally decreasing the amount of data predictively pre-fetched to one or more lower memory levels 50, which, at least in some instances, may facilitate improving computing system operational efficiency, for example, by reducing likelihood of pre-fetched data polluting the one or more lower memory levels 50.

In some embodiments, the memory controller 34 may determine the accuracy confidence associated with a predicted subsequent memory access pattern 134 based at least in part on the type of matched memory access patterns. For example, the memory controller 34 may determine a first predicted subsequent memory access pattern 134, which is predicted based on a longer sequence match, with increased accuracy confidence compared to a second predicted subsequent memory access pattern, which is predicted based on a shorter sequence match. Additionally or alternatively, the memory controller 34 may determine a combined (e.g., signature) predicted subsequent memory access pattern 134, which is predicted based on a combined memory access pattern match, with increased accuracy confidence compared to an inter-demand delay predicted subsequent memory access pattern 134 and/or a data value predicted subsequent memory access pattern 134. In this manner, a (e.g., memory-side and/or processor-side) memory controller 34 may determine a predicted subsequent memory access pattern 134 based at least in part on historical memory access information 112.

Returning to the process 152 of FIG. 9, based on a predicted subsequent memory access pattern 134, the memory-side memory controller 34B may predictively (e.g., preemptively) instruct the memory-side memory sub-system 14B to pre-fetch (e.g., retrieve before demanded) target pre-fetch data 138, which is targeted by and/or identified in the predicted subsequent memory access pattern 134, from the memory array 28 to one or more lower (e.g., cache and/or pre-fetch buffer) memory levels 50 (process block 174). In some embodiments, each data block 56 targeted by the predicted subsequent memory access pattern 134 may be identified as a candidate pre-fetch data block 56. However, when a copy (e.g., instance) of a data block 56 is already stored in a lower memory level 50, storing an additional copy of the data block 56 in the lower memory level 50 may provide limited improvement to computing system operational efficiency and, at least in some instances, may actually reduce resulting computing system operational efficiency, for example, due to storage of the additional (e.g., redundant) copy of the data block 56 resulting in another data block 56 being prematurely evicted from the lower memory level 50. As such, in some embodiments, the memory-side memory controller 34B may cancel pre-fetching of a candidate pre-fetch data block 56 when a valid copy of the data block 56 is already stored in one or more lower memory levels 50.

On the other hand, when a valid copy of a candidate pre-fetch data block 56 is not stored in one or more lower memory levels 50, the memory-side memory controller 34B may identify the candidate pre-fetch data block 56 as a target pre-fetch data block 56 included in target pre-fetch data 138. As described above, in some embodiments, one or more lower memory levels 50 may be implemented in a memory-side memory sub-system 14B and/or in a processor-side memory sub-system 14A. Thus, in some embodiments, the memory-side memory controller 34B may instruct the memory-side memory sub-system 14B to store a copy of a target pre-fetch data block 56 in one or more memory-side lower memory levels 50, such as a shared memory-side cache 110, a memory channel cache 108, and/or a memory-side pre-fetch buffer 32B.

Additionally or alternatively, the memory-side memory controller 34B may instruct the memory-side memory sub-system 14B to output the target pre-fetch data block 56 to a memory bus 20A to enable a processor-side memory sub-system 14A to store a copy of the target pre-fetch data block 56 in one or more processor-side lower memory levels 50, such as a private processor-side cache 46, a shared processor-side cache 48, and/or a processor-side pre-fetch buffer 32A. In fact, although described primarily with regard to a memory-side memory controller 34B, in some embodiments, the predictive data pre-fetching techniques described in the present disclosure may be implemented at least in part by a processor-side memory controller 34A. For example, in such embodiments, the processor-side memory controller 34A (e.g., implemented in a processor chip along with processing circuitry 16 and one or more processor-side caches 24A) may identify target pre-fetch data 138 in an analogous manner as described with regard to the memory-side memory controller 34B. However, instead of a demand memory access request, the processor-side memory controller 34A may output a pre-fetch memory access request (e.g., with a lower fulfillment priority compared to the demand memory access request) that requests return of the target pre-fetch data 138 via the memory bus 20A.

In this manner, the techniques described in the present disclosure may enable a memory sub-system to predictively pre-fetch data with improved efficacy (e.g., accuracy and/or coverage). For example, as described above, data pre-fetching coverage may be improved by considering multiple different types of correlations, such as data value correlations, inter-demand delay correlations, and/or correlations with varying sequence lengths. Additionally or alternatively, as described above, data pre-fetching accuracy may be improved by pre-processing correlation parameters, for example, to remove noise in inter-demand delays and/or to extract representative data values from data blocks. At least in some instances, improving efficacy of predictive data pre-fetching techniques may facilitate improving operation efficiency of the memory sub-system and, thus, a computing system in which the memory sub-system is deployed, for example, by increasing likelihood that demanded data is retrieved from a lower (e.g., cache and/or pre-fetch buffer) memory level instead of a higher (e.g., memory array) memory level and/or by reducing likelihood that pre-fetched data pollutes the lower memory level.

One or more specific embodiments of the present disclosure are described herein and depicted in the corresponding figures. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An apparatus comprising:
processing circuitry; and
memory circuitry comprising a memory array communicatively coupled to the processing circuitry via a bus, wherein the memory circuitry is configured to:
receive a memory access request generated by the processing circuitry via the bus targeting a first data block of the memory array;
access the first data block of the memory array based on a demand time of the memory access request;
determine at least one of a data value correlation parameter determined based at least in part on a raw data value of data bits associated with the first data block and an inter-demand delay correlation parameter determined based at least in part on demand time of the memory access request; and
predictively store data bits associated with a second data block of the memory array at a lower memory level configured to provide faster data read access to the processing circuitry before receiving a subsequent memory access request targeting the second data block based at least in part on the data value correlation parameter, the inter-demand delay correlation parameter, or both.

2. The apparatus of claim 1, wherein the memory access request comprises instructions to read the data bits stored in the first data block or instructions to write data bits to the first data block.

3. The apparatus of claim 1, wherein the demand time is a transmission time of the memory access request by the processing circuitry or a receipt time of the memory access request by the memory circuitry.

4. The apparatus of claim 1, wherein the lower memory level comprises a cache, a pre-fetch buffer, or both, associated with the memory circuitry, processing circuitry, or both.

5. The apparatus of claim 1, wherein the memory circuitry is configured to read the data bits of the second data block stored at the lower memory level based on receiving the subsequent memory access request targeting the second data block.

6. The apparatus of claim 1, wherein the memory circuitry is configured to determine the data value correlation parameter by:
determining the raw data value of the data bits associated with the first data block;
pre-processing the data bits to extract a representative data value that changes at a slower frequency compared to the raw data value; and
setting the data value correlation parameter of the memory access request as the representative data value extracted from the data bits of the first data block.

7. The apparatus of claim 1, wherein the memory circuitry is configured to determine the data value correlation parameter based on a 1's count of the data bits associated with the first data block.

8. The apparatus of claim 1, wherein the memory circuitry is configured to determine the data value correlation parameter based on a raw data value of data bits associated with one or more sub-blocks of the first data block, wherein each sub-block of the one or more sub-blocks comprises a number of non-overlapping or overlapping data bits associated with the first data block.

9. The apparatus of claim 1, wherein the memory circuitry is configured to determine the data value correlation parameter based on an integer raw data value or a floating point raw data value of the data bits associated with the first data block.

10. The apparatus of claim 1, wherein the memory circuitry is configured to:
determine a current memory access pattern based on the data value correlation parameter, the inter-demand delay correlation parameter, or both;
determine whether the current memory access pattern matches a previous memory access pattern; and
predictively store the data bits associated with the second data block at the lower memory level based on the previous memory access pattern in response to determining that the current memory access pattern matches the previous memory access pattern.

11. The apparatus of claim 1, wherein the memory circuitry is configured to determine the inter-demand delay correlation parameter based on a duration between the demand time of the memory access request and a demand time of a previous memory access request.

12. The apparatus of claim 11, wherein the memory circuitry is configured to determine the inter-demand delay correlation parameter by offsetting a time spent servicing a background operation performed between fulfillment of the memory access request and fulfillment of the previous memory access request.

13. A method, comprising:
determining, using a memory controller of a memory device, a first data value correlation parameter associated with a first data block targeted by a current memory access request and a first inter-demand delay correlation parameter determined based at least in part on a first demand time of the current memory access request;
determining, using the memory controller, that a second data value correlation parameter associated with a second data block targeted by a previous memory access request matches the first data value correlation parameter, a second inter-demand delay correlation parameter determined based at least in part on that a second demand time of the previous memory access request matches the first inter-demand delay correlation parameter, or both; and
predictively storing, using the memory controller, a third data block at a lower memory level that provides faster data access before receiving a subsequent memory access request targeting the third data block in response to determining that the second data value correlation parameter matches the first data value correlation parameter, the second inter-demand delay correlation parameter matches the first inter-demand delay correlation parameter, or both.

14. The method of claim 13, wherein predictively storing the third data block at the lower memory level is based on determining a current memory access pattern associated with a previous memory access pattern based on the second data value correlation parameter matching the first data value correlation parameter, the second inter-demand delay correlation parameter matching the first inter-demand delay correlation parameter, or both.

15. The method of claim 13, wherein predictively storing the third data block at the lower memory level is based on determining that the third data block will be targeted by the subsequent memory access request based on a third data value correlation parameter, a third inter-demand delay correlation parameter, or both, associated with an intermediary memory access request fulfilled after the previous memory access request and before the current memory access request, and in response to determining that the second data value correlation parameter matches the first data value correlation parameter, the second inter-demand delay correlation parameter matches the first inter-demand delay correlation parameter, or both.

16. The method of claim 13, comprising:
determining, using the memory controller, the first data value correlation parameter associated with the current memory access request at least in part by pre-processing data bits used to indicate a raw data value in the first data block targeted by the current memory access request; and
determining, using the memory controller, the first inter-demand delay correlation parameter associated with the current memory access request at least in part by pre-processing the first demand time of the current memory access request to determine duration between consecutive memory access requests.

17. A computing system comprising a processor chip, wherein the processor chip comprises:
processing circuitry configured to transmit a memory access request targeting a first data block;
cache circuitry; and
memory circuitry comprising a memory array communicatively coupled to the processing circuitry, wherein the cache circuitry is configured to receive the memory access request, wherein the memory circuitry is configured to:
determine a data value correlation parameter determined based at least in part on data bits used to indicate a raw data value of the first data block in response to receiving the memory access request;
determine an inter-demand delay correlation parameter associated with the memory access request at least in part by processing a duration between a demand time of the memory access request and a demand time of a previously fulfilled memory access request and removing a time associated with one or more background operations performed by the computing system between fulfillment of the memory access request and fulfillment of the previously fulfilled memory access request from the duration;
predict that the processing circuitry will subsequently transmit a subsequent memory access request targeting a second data block based at least in part on one of the data value correlation parameter and the inter-demand delay correlation parameter; and
generate a pre-fetch request that instructs storage of the second data block on the cache circuitry.

18. The computing system of claim 17, wherein predicting that the subsequent memory access request targets the second data block is based on determining a current memory access pattern based on determining the data value correlation parameter, the inter-demand delay correlation parameter, or both.

19. The computing system of claim 18, wherein determining the current memory access pattern is based on associating a previous memory access pattern of the previously fulfilled memory access request by determining that a second data value correlation parameter, a second inter-demand delay correlation parameter, or both, are associated with the previously fulfilled memory access request matches the data value correlation parameter, the inter-demand delay correlation parameter, or both.

20. The computing system of claim 18, wherein the memory circuit is configured to:
determine the first data value correlation parameter at least in part by pre-processing data bits used to indicate a raw data value in the first data block; and
determine the first inter-demand delay correlation parameter at least in part by pre-processing a demand time of the request to determine duration between consecutive memory access requests.

* * * * *